US012710397B2

(12) United States Patent
Lamothe et al.

(10) Patent No.: US 12,710,397 B2
(45) Date of Patent: Aug. 18, 2026

(54) MULTIPLEXING SURFACE ACOUSTIC WAVE SENSORS WITH DELAY LINE CODING

(71) Applicant: AVIANA MOLECULAR TECHNOLOGIES, LLC, Orlando, FL (US)

(72) Inventors: Marc Lamothe, Orlando, FL (US); Mo-Huang Li, Wesley Chapel, FL (US)

(73) Assignee: AVIANA MOLECULAR TECHNOLOGIES, LLC, Orlando, FL (US)

(*) Notice: Subject to any disclaimer, the term of this patent is extended or adjusted under 35 U.S.C. 154(b) by 451 days.

(21) Appl. No.: 16/629,307

(22) PCT Filed: Jul. 6, 2018

(86) PCT No.: PCT/US2018/040993
§ 371 (c)(1),
(2) Date: Jan. 7, 2020

(87) PCT Pub. No.: WO2019/010356
PCT Pub. Date: Jan. 10, 2019

(65) Prior Publication Data
US 2020/0284763 A1 Sep. 10, 2020

Related U.S. Application Data

(60) Provisional application No. 62/529,725, filed on Jul. 7, 2017.

(51) Int. Cl.
*G01N 29/02* (2006.01)
*G01N 29/22* (2006.01)
(Continued)

(52) U.S. Cl.
CPC ......... *G01N 29/022* (2013.01); *G01N 29/222* (2013.01); *G01N 29/2462* (2013.01);
(Continued)

(58) Field of Classification Search
CPC .. G01N 29/022; G01N 29/2468; G01N 29/34; G01N 29/2462; G01N 29/2481; G01N 29/222
See application file for complete search history.

(56) References Cited

U.S. PATENT DOCUMENTS 4,237,432 A * 12/1980 Huang ................ H03H 9/0296 333/194
4,801,836 A * 1/1989 Mariani .................. H03H 9/44 310/313 D
(Continued)

FOREIGN PATENT DOCUMENTS

EP 0088493 A2 9/1983
GB 2044570 A 10/1980
(Continued)

OTHER PUBLICATIONS

International Preliminary Report on Patentability dated Jan. 16, 2020 for related Application No. PCT/US18/40993.
(Continued)

*Primary Examiner* — Helen C Kwok
(74) *Attorney, Agent, or Firm* — Day Pitney LLP; Richard B. Emmons

(57) ABSTRACT

A multiplexing surface acoustic wave (SAW) device for simultaneous excitation of SAW sensors or simultaneous sensing of multiple analytes, targets or bio-agents is described. The device includes a plurality of SAW sensors arranged in an array. Each sensor has a delay line and each of the delay lines are different in length. The sensors of the multiplexing SAW device are excited simultaneously to
(Continued)

generate an array of surface acoustic waves propagating along the delay lines of each SAW sensor. Because the length of each delay line is different for each SAW sensor, the propagation time of the surface acoustic waves varies in based at least in part on the length variation. A compressed pulse train can be generated with a specific time delay according to the length difference of delay lines, and phase or other information of the compressed pulse can be extracted.

17 Claims, 15 Drawing Sheets

(51) Int. Cl.
*G01N 29/24* (2006.01)
*G01N 29/34* (2006.01)

(52) U.S. Cl.
CPC ..... *G01N 29/2468* (2013.01); *G01N 29/2481* (2013.01); *G01N 29/34* (2013.01); *G01N 2291/106* (2013.01)

(56) References Cited

U.S. PATENT DOCUMENTS

| | | | | |
|---|---|---|---|---|
| 5,012,668 | A * | 5/1991 | Haworth | G01N 29/022 73/24.06 |
| 5,325,704 | A * | 7/1994 | Mariani | G01N 29/022 73/24.01 |
| 6,047,306 | A | 4/2000 | Hikita et al. | |
| 7,741,956 | B1 * | 6/2010 | Nysen | G01S 13/755 340/10.33 |
| 8,240,911 | B1 * | 8/2012 | Pfeifer | G01K 17/00 374/117 |
| 8,436,509 | B1 * | 5/2013 | Branch | G01N 29/022 310/313 R |
| 9,477,857 | B2 * | 10/2016 | Youngquist | G06K 19/0675 |
| 9,678,042 | B2 | 6/2017 | Kogai et al. | |
| 2006/0000285 | A1 * | 1/2006 | Edmonson | G01N 29/022 73/649 |
| 2006/0230834 | A1 * | 10/2006 | Liu | G01L 9/0025 73/649 |
| 2007/0241637 | A1 * | 10/2007 | Kalantar-Zadeh | G01N 29/022 310/313 D |
| 2007/0296305 | A1 | 12/2007 | Hines et al. | |
| 2008/0156100 | A1 * | 7/2008 | Hines | G01N 29/2481 73/584 |
| 2010/0058834 | A1 * | 3/2010 | Cobianu | G01N 29/022 73/24.01 |
| 2010/0154545 | A1 * | 6/2010 | Edmonson | G01N 29/022 73/599 |
| 2011/0136262 | A1 * | 6/2011 | Ragavan | G01N 29/226 422/69 |
| 2011/0285510 | A1 | 11/2011 | Malocha et al. | |
| 2013/0130362 | A1 * | 5/2013 | Hines | G01N 29/022 422/68.1 |
| 2014/0001918 | A1 * | 1/2014 | Lee | H10N 30/875 310/313 B |
| 2014/0007692 | A1 * | 1/2014 | Hines | G01H 11/08 333/193 |
| 2015/0089093 | A1 * | 3/2015 | Rhee | G06F 11/2289 710/16 |
| 2015/0111765 | A1 * | 4/2015 | Laury-Kleintop | G01N 33/551 435/7.5 |
| 2016/0282204 | A1 | 9/2016 | Haines et al. | |
| 2020/0284762 | A1 * | 9/2020 | Li | G01N 29/036 |

FOREIGN PATENT DOCUMENTS

| | | | |
|---|---|---|---|
| JP | H08-68781 | A | 3/1996 |
| JP | 2007-520698 | A | 7/2007 |
| JP | 2007-524853 | A | 8/2007 |
| JP | 2011232231 | A | 11/2011 |
| JP | 2012-247220 | * | 12/2012 |
| JP | 2012-247220 | A | 12/2012 |
| JP | 2013-096866 | A | 5/2013 |
| JP | 2013-533489 | A | 8/2013 |
| JP | 2015-059878 | * | 3/2015 |
| JP | 2015-059878 | A | 3/2015 |
| KR | 10-2007-0121831 | A | 12/2007 |
| KR | 10-2012-0131306 | A | 12/2012 |
| RU | 2585911 | C1 | 6/2016 |
| WO | 2005/066621 | A1 | 7/2005 |
| WO | 2005/083882 | A1 | 9/2005 |
| WO | 2006/112913 | A1 | 10/2006 |
| WO | 2015/088446 | A1 | 6/2015 |
| WO | 2019010356 | A1 | 1/2019 |

OTHER PUBLICATIONS

International Search Report and Written Opinion dated Nov. 9, 2018 for related Application No. PCT/US18/40993.
Extended European Search Report dated Feb. 5, 2021 for related European Application No. 18829152.0.
Office Action in corresponding Korean application No. 10-2020-7003471 dated Feb. 13, 2023.
Office Action in corresponding IL application No. 271872 dated Sep. 6, 2023.
Second Office Action in corresponding Chinese application No. 201880058048.4 dated Sep. 23, 2023.
The description of CN Publication of Unexamined Patent Application No. 102749130 dated Oct. 24, 2012.
Reconsideration Report by Examiner before Appeal in corresponding Japanese application No. 2020-521852 dated Sep. 26, 2023.
Decision of Rejection in corresponding Korea application No. 10-2020-7003471 dated Nov. 27, 2023.
Rejection Decision in corresponding Chinese application No. 201880058048.4 dated Jan. 29, 2024.
Examination Report in corresponding Canadian application No. 3,069,154 dated Jan. 25, 2024.
Office Action in corresponding Korean application No. 10-2020-7003471 dated Mar. 27, 2024.
Newton et al.: "Layer-guided shear acoustic plate mode sensor", Mar. 2003.
Mchale et al.: "Layer guided shear horizontal acoustic plate mode sensors", May 2002.
Office Action in corresponding EP application No. 18829152.0 dated Feb. 21, 2024.
Office Action in corresponding Israel application No. 271872 dated Sep. 19, 2024.
Examination Report in corresponding AU application No. 2023248202 dated Feb. 6, 2025.

* cited by examiner

Hardware Processor 804
808
SAW Device 802
SAW Sensor 1
SAW Sensor 2
SAW Sensor N
810
820
812
822
814
824
Excitation Signal
806

MULTIPLEXING SURFACE ACOUSTIC WAVE SENSORS WITH DELAY LINE CODING

CROSS REFERENCE TO RELATED APPLICATIONS

This patent application is a national stage application, filed under 35 U.S.C. § 371, of International Application No. PCT/US18/40993, filed Jul. 6, 2018, which claims the benefit of priority of U.S. Provisional Application No. 62/529,725, including Appendix A entitled "APPARATUS AND METHOD FOR FREQUENCY MODULATION SURFACE ACOUSTIC WAVE SENSOR" and Appendix B entitled "BULK ACOUSTIC WAVE(S) AND/OR SURFACE ACOUSTIC WAVE(S)," filed therewith, filed on Jul. 7, 2017, the entire contents of which are hereby incorporated by reference.

FIELD

The present disclosure relates generally to devices and methods for simultaneously identifying, detecting, measuring or sensing multiple analytes using Surface Acoustic Wave (SAW) or Bulk Acoustic Wave (BAW) sensors. More particularly, the disclosure relates to a multiple SAW and/or BAW sensor device capable of simultaneously sensing a plurality of target materials using SAW and/or BAW sensors with differing lengths of delay lines.

BACKGROUND

A Surface Acoustic Wave (SAW) sensor and/or a Bulk Acoustic Wave (BAW) sensor is an element or a device for identifying, detecting, sensing or measuring various physical, chemical, or biological quantities or changes in quantities of various kinds of chemical or biological material, such as those in liquid media and organic or inorganic gases. There is an urgent need for point of care (time to result <30 min), portable, multiplexed (can screen multiple target analytes simultaneously form a biological fluid) sensors with high sensitivity and specificity without any sample processing.

SUMMARY

The SAW sensor is a passive electronic device. An input electrical signal is applied to the pads. The transducer transforms the electrical signal into a mechanical signal, which is called a Surface Acoustic Wave (SAW). Sensor response is equivalent to the property changes (phase, amplitude and frequency or delay) of the mechanical wave. For example, a variance in at least one of amplitude, phase, frequency, or time-delay between pulses of the receiving signal (Rx) and/or the excitation signal. For example, the multiplexing SAW measurement system can include phase detection which can determine a phase corresponding to each of the plurality of pulses with respect to each other and/or the excitation signal. For example, the difference in delay line length between the SAW sensors results in a time delay between the pulses of the received signal (Rx). The shifts in time domain between the pulses of the compressed pulse train correspond to phase shifts associated with a particular SAW sensor. The phase shifts can be determined, for example, using a software program or field programmable gate array (FPGA) hardware.

In one aspect, the disclosure provides a surface acoustic wave (SAW) device, including: a piezoelectric substrate; and a plurality of SAW sensors attached to the piezoelectric substrate and arranged on a surface of the piezoelectric substrate, the plurality of SAW sensors including a first SAW sensor comprising a first delay line configured to propagate a first surface acoustic wave, and a second SAW sensor comprising a second delay line configured to propagate a second surface acoustic wave, wherein a length of the first delay line is greater than a length of the second delay line.

In an embodiment, the first SAW sensor includes: a first transducer for transmitting the first surface acoustic wave along the first delay line, and a second transducer for receiving the first surface acoustic wave upon propagation of the first surface acoustic wave along the first delay line.

In an embodiment, the first SAW sensor comprises a transducer positioned on the substrate and a reflector positioned on the substrate opposite the transducer, wherein the transducer transmits the first surface acoustic wave along the first delay line, and the transducer receives the first surface acoustic wave after the first surface acoustic reflects off the reflector and propagates along the first delay line twice.

In an embodiment, the reflector is a first reflector and wherein the first SAW sensor further comprises a second reflector positioned on the substrate proximate the first reflector relative to the transducer, wherein the transducer is configured to receive the first surface acoustic wave upon reflecting off the second reflector and propagating along the first delay line twice.

In an embodiment, the first reflector is configured to reflect a surface acoustic wave having a first frequency and the second reflector is configured to reflect a surface acoustic wave having a second frequency.

In an embodiment, the first SAW sensor comprises a first pair of electrical contacts and the second SAW sensor comprises a second pair of electrical contacts, and wherein the first and second pairs of electrical contacts are electrically connected.

In an embodiment, each of the saw sensors are configured to receive an excitation signal.

In an embodiment, the excitation signal includes at least one of a pulse voltage, a sinusoidal electrical signal, frequency modulation, linear frequency modulation, hyperbolic frequency modulation, orthogonal frequency coding, random modulation, continuous phase modulation, frequency shift key, multi-frequency shift key, phase shift key, wavelet modulation, or a wideband frequency signal.

In an embodiment, each of the saw sensors are configured to simultaneously receive the excitation signal.

In an embodiment, the device further includes: one or more processors in communication with each of the first SAW sensor and the second SAW sensor, the one or more processors configured to generate a receiving signal based at least in part on signals received from the first SAW sensor and the second SAW sensor.

In an embodiment, the one or more processors are further configured to determine or monitor at least one analyte based at least in part on the receiving signal.

In an embodiment, the one or more processors are configured to determine or monitor identify the at least one analyte by detecting a variance in amplitude, phase, frequency, or time-delay between at least two of a pulse corresponding to the excitation signal, a pulse corresponding to the first SAW sensor, or a pulse correspond to the second SAW sensor.

In an embodiment, the receiving signal comprises a compressed pulse train having a plurality of pulses.

In an embodiment, the plurality of pules of the compressed pulse train includes: a first pulse corresponding to the first SAW sensor, and a second pulse corresponding to the second SAW sensor.

In an embodiment, a timing of the first pulse is based at least in part on the length of the first delay line, and wherein a timing of the second pulse is based at least in part on the length of the second delay line.

In an embodiment, the plurality of pulses of the compressed pulse train comprises a pulse corresponding to the excitation signal.

In an embodiment, the piezoelectric substrate comprises at least one of 36° Y quartz, 36° YX lithium tantalite, langasite, langatate, langanite, lead zirconate titanate, cadmium sulfide, berlinite, lithium iodate, lithium tetraborate, or bismuth germanium oxide.

In an embodiment, the piezoelectric substrate comprises a piezoelectric crystal layer.

In an embodiment, the piezoelectric crystal layer comprises a thickness greater than a Love Wave penetration depth on a non-piezoelectric substrate.

In an embodiment, the device further includes a sensing region located at the first delay line and configured to attach to or react with an analyte.

In an embodiment, the device further includes a detector for measuring a phase response of surface acoustic waves as a function of an analyte added to the sensing region.

In an embodiment, the sensing region comprises a biologically sensitive interface for capturing analytes from a liquid media.

In an embodiment, the sensing region comprises a chemically sensitive interface for absorbing analytes from a liquid media.

In an embodiment, the device further includes a guiding layer on the first delay line.

In an embodiment, the guiding layer comprises at least one of a polymer, SiO2 or ZnO.

In an embodiment, a first surface acoustic wave corresponding to the first SAW sensors comprises a frequency greater than 100 MHz, greater than 300 MHz, greater than 500 MHz, or greater than 1000 MHz.

In one aspect, the disclosure provides a method including the steps of: generating an excitation signal; transmitting the excitation signal to a surface acoustic wave (SAW) device, wherein the SAW device comprises a first SAW sensor including a first delay line configured to propagate a first surface acoustic wave, and a second SAW sensor including a second delay line configured to propagate a second surface acoustic wave, wherein a length of the first delay line is greater than a length of the second delay line; receiving an output signal of the SAW device, the output signal indicative of at least one of the first delay line, the length of the second delay line, or an analyte exposed to at least one of the first SAW sensor or the second SAW sensor; and determining or monitoring the analyte based at least in part on the output signal of the SAW device.

In one aspect, the disclosure provides a method including the steps of: receiving an excitation signal; generating a first surface acoustic wave for propagation across a first delay line of a first SAW sensor of a SAW device; generating a second surface acoustic wave for propagation across a second delay line of a second SAW sensor of the SAW device, wherein a length of the first delay line is greater than a length of the second delay line; receiving the first surface acoustic wave after propagation across the first delay line; receiving the second surface acoustic wave after propagation across the second delay line; and generating a signal based at least in part on at least one of the received first surface acoustic wave, the received second acoustic wave, or the excitation signal.

In an embodiment, the first SAW sensor comprises a reflector configured to reflect the first surface acoustic wave, and wherein said receiving the first surface acoustic wave occurs after the first acoustic wave is reflected.

In an embodiment, the second SAW sensor comprises a reflector configured to reflect the second surface acoustic wave, and wherein said receiving the second surface acoustic wave occurs after the second acoustic wave is reflected.

In one aspect, the disclosure provides a method including the steps of: generating an excitation signal; transmitting the excitation signal to a surface acoustic wave (SAW) device, wherein the SAW device comprises a first SAW sensor including a first delay line configured to propagate a first surface acoustic wave, and a second SAW sensor including a second delay line configured to propagate a second surface acoustic wave, wherein a length of the first delay line is greater than a length of the second delay line; receiving the excitation signal at the SAW device; generating a first surface acoustic wave for propagation across the first delay line; generating a second surface acoustic wave for propagation across the second delay line; receiving the first surface acoustic wave after propagation across the first delay line; receiving the second surface acoustic wave after propagation across the second delay line; generating a signal based at least in part on at least one of the received first surface acoustic wave or the received second acoustic wave, wherein the signal is indicative of at least one of the first delay line, the length of the second delay line, or an analyte exposed to at least one of the first SAW sensor or the second SAW sensor; and determining or monitoring the analyte based at least in part on the generated signal.

In one aspect, the disclosure provides a method including the steps of: exposing at least a portion of a SAW device to a sample media comprising an analyte, wherein the SAW device comprises a first SAW sensor including a first delay line configured to propagate a first surface acoustic wave responsive to an excitation signal, and a second SAW sensor including a second delay line configured to propagate a second surface acoustic wave responsive to the excitation signal, wherein a length of the first delay line is greater than a length of the second delay line, and wherein a sensitive region of at least one of the first delay line or the second delay line reacts to the analyte such that at least one of the first surface acoustic wave or the second surface acoustic wave is altered; receiving a signal corresponding to an output of a SAW device; identifying a first pulse of the received signal, wherein the first pulse corresponds to the first SAW sensor; identifying a second pulse of the received signal, wherein the second pulse corresponds to the second SAW sensor; identifying a third pulse of the received signal, wherein the third pulse corresponds to the excitation signal; determining at least one of a phase, frequency, amplitude, or timing of at least two of the first pulse, the second pulse, or the third pulse; and based at least in part on said determining, identifying or monitoring the analyte.

In an embodiment, the identifying or monitoring the analyte comprises determining a variance in at least one of amplitude, phase, frequency, or time-delay between at least two of the first pulse, the second pulse or the third pulse.

In one aspect, the disclosure provides a method including the steps of: generating sequentially several excitations signals which are route sequentially through a multiplexer to different delay lines which generate responses which are route sequentially through the same or a different multiplexer to the receiving electronics.

A Surface Acoustic Wave (SAW) device including a piezoelectric substrate and a plurality of SAW sensors attached to the piezoelectric substrate and arranged on a surface of the piezoelectric substrate. The plurality of SAW sensors includes a first SAW device and a second SAW device. The first SAW sensor includes a first delay line configured to propagate a first surface acoustic wave. The second SAW sensor includes a second delay line configured to propagate a second surface acoustic wave. A length of the first delay line is greater than a length of the second delay line or the length of the second delay line is greater than the length of the first delay line.

The device of the preceding paragraph may also include any combination of the following features described in this paragraph, among other features described herein. In some embodiments, the first SAW sensor further includes a first transducer for transmitting the first surface acoustic wave along the first delay line and a second transducer for receiving the first surface acoustic wave upon propagation of the first surface acoustic wave along the first delay line.

The device of any of the preceding paragraphs may also include any combination of the following features described in this paragraph, among other features described herein. In some embodiments, the first SAW sensor can further include a transducer positioned on the substrate and a reflector positioned on the substrate opposite the transducer. The transducer is configured to transmit the first surface acoustic wave along the first delay line and the transducer is further configured to receive the first surface acoustic wave after the first surface acoustic reflects off the reflector and propagates along the first delay line twice. In some embodiments, the reflector is a first reflector and the first SAW sensor further includes a second reflector positioned on the substrate proximate the first reflector relative to the transducer. The transducer is configured to receive the first surface acoustic wave upon reflecting off the second reflector and propagating along the first delay line twice. In some embodiments, the first reflector is configured to reflect a surface acoustic wave having a first frequency and the second reflector is configured to reflect a surface acoustic wave having a second frequency.

The device of any of the preceding paragraphs may also include any combination of the following features described in this paragraph, among other features described herein. In some embodiments, the first SAW sensor includes a first pair of electrical contacts and the second SAW sensor includes a second pair of electrical contacts. The first and second pairs of electrical contacts are electrically connected. In some embodiments, each of the SAW sensors are configured to receive an excitation signal. In some embodiments, the excitation signal includes at least one of a pulse voltage, a sinusoidal electrical signal, frequency modulation, linear frequency modulation, hyperbolic frequency modulation, orthogonal frequency coding, random modulation, continuous phase modulation, frequency shift key, multi-frequency shift key, phase shift key, wavelet modulation, or a wideband frequency signal. In some embodiments, each of the SAW sensors are configured to simultaneously receive the excitation signal.

The device of any of the preceding paragraphs may also include any combination of the following features described in this paragraph, among other features described herein. In some embodiments, the SAW device further includes one or more processors in communication with each of the first SAW sensor and the second SAW sensor. The one or more processors can be configured to generate a receiving signal based at least in part on signals received from the first SAW sensor and the second SAW sensor. In some embodiments, the one or more processors are further configured to determine or monitor at least one analyte based at least in part on the receiving signal. In some embodiments, the one or more processors are further configured to identify the at least one analyte by detecting a variance in amplitude, phase, frequency, or time-delay between at least two of a pulse corresponding to the excitation signal, a pulse corresponding to the first SAW sensor, or a pulse correspond to the second SAW sensor.

The device of any of the preceding paragraphs may also include any combination of the following features described in this paragraph, among other features described herein. In some embodiments, the receiving signal includes a compressed pulse train having a plurality of pulses. In some embodiments, the plurality of pules of the compressed pulse train includes a first pulse corresponding to the first SAW sensor, and a second pulse corresponding to the second SAW sensor. In some embodiments, a timing of the first pulse is based at least in part on the length of the first delay line, and a timing of the second pulse is based at least in part on the length of the second delay line. In some embodiments, the plurality of pulses of the compressed pulse train includes a pulse corresponding to the excitation signal.

The device of any of the preceding paragraphs may also include any combination of the following features described in this paragraph, among other features described herein. In some embodiments, the piezoelectric substrate includes at least one of 36° Y quartz, 36° YX lithium tantalite, langasite, langatate, langanite, lead zirconate titanate, cadmium sulfide, berlinite, lithium iodate, lithium tetraborate, or bismuth germanium oxide. In some embodiments, the piezoelectric substrate includes a piezoelectric crystal layer. In some embodiments, the piezoelectric crystal layer includes a thickness greater than a Love Wave penetration depth on a non-piezoelectric substrate.

The device of any of the preceding paragraphs may also include any combination of the following features described in this paragraph, among other features described herein. In some embodiments, the SAW device further includes a sensing region located at the first delay line and configured to attach to or react with an analyte. In some embodiments, the sensing region includes a biologically sensitive interface for capturing analytes from a liquid media. In some embodiments, the sensing region includes a chemically sensitive interface for absorbing analytes from a liquid media. In some embodiments, the SAW device further includes a detector for measuring a phase response of surface acoustic waves as a function of an analyte added to the sensing region. In some embodiments, the SAW device further includes a guiding layer on the first delay line. In some embodiments, the guiding layer includes at least one of a polymer, SiO2 or ZnO. In some embodiments, a first surface acoustic wave corresponding to the first SAW sensors includes a frequency greater than 100 MHz, greater than 300 MHz, greater than 500 MHz, or greater than 1000 MHz.

As described herein, a method may include generating an excitation signal and transmitting the excitation signal to a surface acoustic wave (SAW) device. The SAW device includes a first SAW sensor having a first delay line configured to propagate a first surface acoustic wave, and a second SAW sensor having a second delay line configured to propagate a second surface acoustic wave. A length of the first delay line is greater than a length of the second delay line or the length of the second delay line is greater than the length of the first delay line. The method further includes receiving an output signal of the SAW device. The output signal is indicative of at least one of the first delay line, the length of the second delay line, or an analyte exposed to at least one of the first SAW sensor or the second SAW sensor. The method further includes determining or monitoring the analyte based at least in part on the output signal of the SAW device.

As described herein, a method may include receiving an excitation signal and generating a first surface acoustic wave for propagation across a first delay line of a first SAW sensor of a SAW device. The method further includes generating a second surface acoustic wave for propagation across a second delay line of a second SAW sensor of the SAW device. A length of the first delay line is greater than a length of the second delay line or the length of the second delay line is greater than the length of the first delay line. The method further includes receiving the first surface acoustic wave after propagation across the first delay line, and receiving the second surface acoustic wave after propagation across the second delay line. The method further includes generating a signal based at least in part on at least one of the received first surface acoustic wave, the received second acoustic wave, or the excitation signal.

The method of the preceding paragraph may also include any combination of the following steps or features described in this paragraph, among other steps or features described herein. In some embodiments, the first SAW sensor includes a reflector configured to reflect the first surface acoustic wave, and said receiving the first surface acoustic wave occurs after the first acoustic wave is reflected. In some embodiments, the second SAW sensor includes a reflector configured to reflect the second surface acoustic wave, and said receiving the second surface acoustic wave occurs after the second acoustic wave is reflected.

A method as described herein may also include generating an excitation signal and transmitting the excitation signal to a surface acoustic wave (SAW) device. The SAW device includes a first SAW sensor including a first delay line configured to propagate a first surface acoustic wave, and a second SAW sensor including a second delay line configured to propagate a second surface acoustic wave. A length of the first delay line is greater than a length of the second delay line or the length of the second delay line is greater than the length of the first delay line. The method further includes receiving the excitation signal at the SAW device, generating a first surface acoustic wave for propagation across the first delay line, generating a second surface acoustic wave for propagation across the second delay line, receiving the first surface acoustic wave after propagation across the first delay line, receiving the second surface acoustic wave after propagation across the second delay line; and generating a signal based at least in part on at least one of the received first surface acoustic wave or the received second acoustic wave. The signal is indicative of at least one of the first delay line, the length of the second delay line, or an analyte exposed to at least one of the first SAW sensor or the second SAW sensor. The method further includes determining or monitoring the analyte based at least in part on the generated signal.

A method as disclosed herein may also include generating several excitation signals and transmitting the excitation signals sequentially to one or several SAW devices. A radio-frequency multiplexer connects a first SAW device section comprising one or several delay lines to a first section containing one or several excitations signals, the multiplexer connects a second SAW device section comprising one or several delay lines to the second excitation signal section and so on. Each SAW device section can be on the same or different SAW devices and comprises one or several delay lines with the same or different length. The method further includes receiving sequentially signals corresponding to the output of the SAW sections. The multiplexer routing is used to determine which section of the SAW device is active.

According to the techniques herein, a method may also include exposing at least a portion of a SAW device to a sample media comprising an analyte. The SAW device includes a first SAW sensor having a first delay line configured to propagate a first surface acoustic wave responsive to an excitation signal, and a second SAW sensor having a second delay line configured to propagate a second surface acoustic wave responsive to the excitation signal. A length of the first delay line is greater than a length of the second delay line or the length of the second delay line is greater than the length of the first delay line. A sensitive region of at least one of the first delay line or the second delay line is configured to react to the analyte such that at least one of the first surface acoustic wave or the second surface acoustic wave is altered. The method further includes receiving a signal corresponding to an output of a SAW device, identifying a first pulse, second pulse, and a third pulse of the received signal. The first pulse corresponds to the first SAW sensor. The second pulse corresponds to the second SAW sensor. The third pulse corresponds to the excitation signal. The method further includes determining at least one of a phase, frequency, amplitude, or timing of at least two of the first pulse, the second pulse, or the third pulse, and based at least in part on said determining, identifying or monitoring the analyte.

The method of the preceding paragraph may also include any combination of the following steps or features described in this paragraph, among other steps or features described herein. In some embodiments, said identifying or monitoring the analyte comprises determining a variance in at least one of amplitude, phase, frequency, or time-delay between at least two of the first pulse, the second pulse or the third pulse.

Any of the features, components, or details of any of the arrangements or embodiments disclosed in this application, including without limitation any of the SAW device embodiments or method embodiments as disclosed herein, are interchangeably combinable with any other features, components, or details of any of the arrangements or embodiments disclosed herein to form new arrangements and embodiments.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or"

is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," "attached" or any variant thereof means any connection or coupling, either direct or indirect, between two or more elements; the coupling or connection between the elements can be physical, logical, or a combination thereof.

Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further implementations of the disclosure.

Details of the system may vary considerably in its specific implementation, while still being encompassed by the disclosure herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

DETAILED DESCRIPTION

Figure 1A:
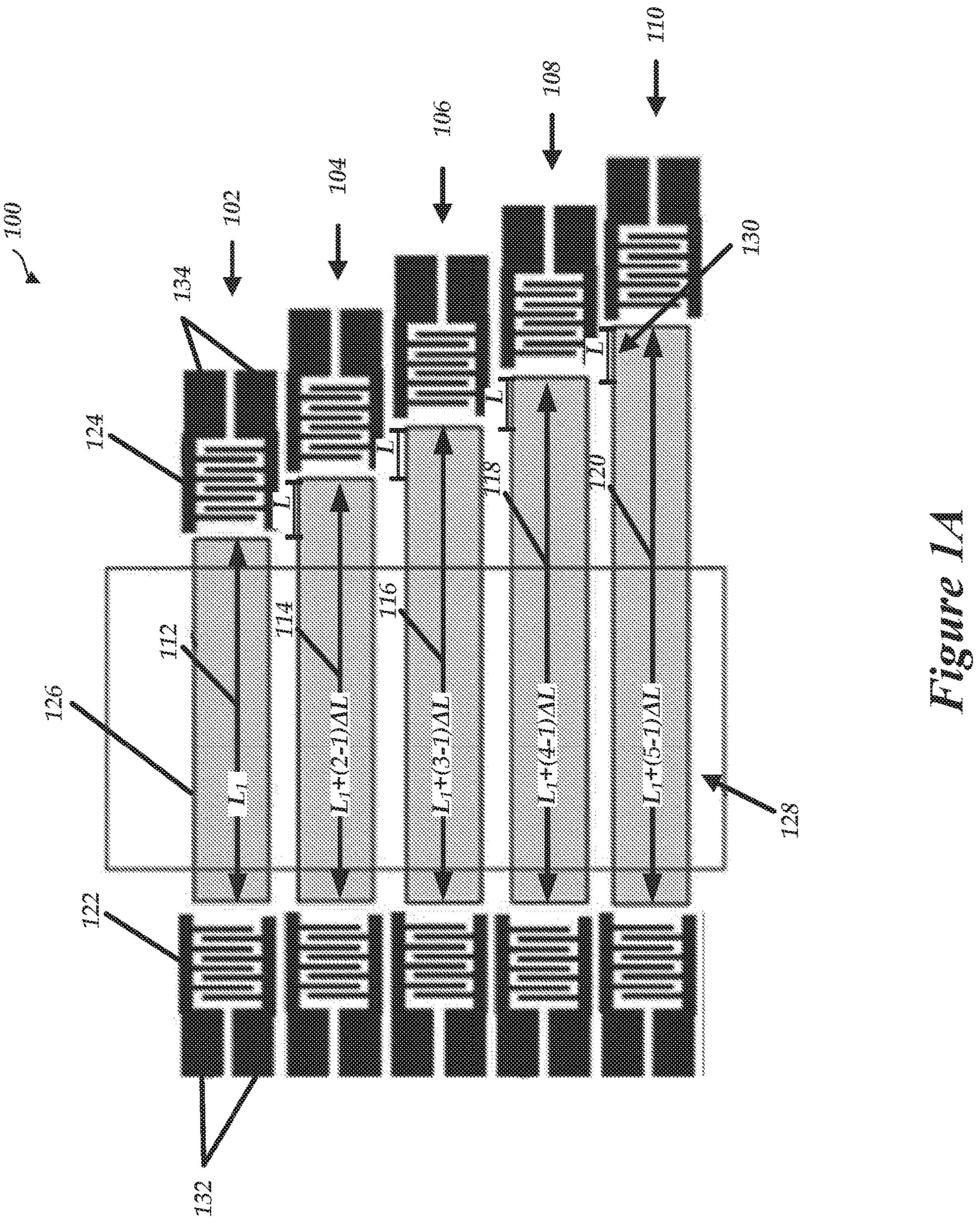
FIG. 1A is a diagram of a Surface Acoustic Wave (SAW) device, according to exemplary embodiments.

A Surface Acoustic Wave (SAW) sensor or a Bulk Acoustic Wave (BAW) sensor is utilized to determine or monitor an analyte (sometimes referred to as a target material) present in media, such as liquid, solid, gaseous or biological media. A SAW sensor can include a receptor configured to bind to one or more analyte(s) on a surface of the SAW sensor. When a sample media containing the one or more analyte(s) is placed on the SAW sensor, a physical, chemical or electrical reaction occurs between the analyte and the receptor. The resulting change is used to determine or monitor the content of the analyte.

A SAW device can include a piezoelectric substrate, an input interdigitated transducer (IDT) (sometimes referred to as a transmitting IDT) on one portion of the surface of the piezoelectric substrate, and an output IDT (sometimes referred to as a receiving IDT) on another portion of the piezoelectric substrate. The transmitting IDT can be excited with an excitation signal. For example, the excitation signal can include a variety of signals including, but not limited to, a pulse voltage, a sinusoidal electrical signal, frequency modulation, linear frequency modulation, hyperbolic frequency modulation, orthogonal frequency coding, random modulation, continuous phase modulation, frequency shift key, multi-frequency shift key, phase shift key, wavelet modulation, a wideband signal, and the like. Due to the piezoelectric effect, the transmitting IDT produces a surface acoustic wave which propagates along the space between the IDTs (generally referred to as the delay line) in the direction of the receiving IDT. After propagating along the delay line, a wavelength of the surface acoustic wave may change due to a physical, chemical or electrical reaction between the analyte and the receptor. The surface acoustic wave reaches the receiving IDT, and by the piezoelectric effect, the receiving IDT converts the acoustic wave into a receiving signal, such as an electrical signal.

In some embodiments, the receptor (also referred to as a sensitive layer) is placed on the delay line. When the sensitive layer is exposed to an analyte such as a particular gas, chemical material, biological material, and the like, a quantifiable change occurs in the sensitive layer, such that as the surface acoustic wave propagates along the delay line, the sensitive layer modulates or changes the surface acoustic wave. For example, a phase, velocity, amplitude or frequency of the surface acoustic wave can be altered as the surface acoustic wave propagates across the sensitive layer.

By comparing the excitation signal and receiving signal(s), characteristics of the analyte can be quantified. For example, changes in velocity or amplitude of the surface acoustic wave can correspond to changes in amplitude, frequency, phase-shift, or time-delay in the receiving signal, as compared to the excitation signal. Accordingly, a SAW sensor advantageously provides the ability to measure nearly any physical or chemical interference which affects the propagation of SAW and would cause the change of an output electrical signal.

In addition, as the surface acoustic wave propagates along the delay line, there is a noticeable and measurable delay of the receiving signal, as compared to the excitation signal. This delay can be at least partially attributable to the length of the delay line. Thus, in some embodiments, multiple SAW sensors are utilized, each having a delay line of a different length. Because the length of the delay line affects the delay of the receiving signal, each of the receiving signals of the multiple SAW sensors can have different delays. Thus, in some instances, a SAW device can simultaneously utilize multiple SAW sensors (having differing delay line lengths) to measure a plurality of analytes.

In some embodiments, the receiving IDT is replaced by a reflector. The surface acoustic wave passes through the delay line, reflects off the reflector, and passes back through the delay line before arriving back at the transmitting IDT.

For a biosensor, when a biomolecule, such as a protein, antibody, antigen, deoxyribonucleic acid ("DNA"), ribonucleic acid ("RNA"), bacteria, an animal cell, a virus or tissue, and a toxin generated therefrom, binds to a surface of the biosensor, a surface mass of the sensor changes, and thereby a signal drift occurs in the sensor. As a result, the biosensor can determine or monitor the content of the target material.

Uni-Directional SAW Sensors

FIG. 1A is a diagram of a Surface Acoustic Wave (SAW) device 100, according to some embodiments. The SAW device 100 includes a piezoelectric substrate (not illustrated) and an array of SAW sensors 102, 104, 106, 108, 110 having delay lines 126 of different lengths 112, 114, 116, 118, 120. In some instances herein, the SAW device 100 is described with respect to sensor 102. However, some or all of the other SAW sensors 104, 106, 108, 110 can have components or features similar or different to those described with respect to SAW sensor 102.

The SAW sensor 102 resides on the substrate and includes a transmitting interdigitated transducer (IDT) 122 that excites a surface acoustic wave into the piezoelectric substrate. The SAW sensor 102 also includes a receiving IDT 124 that detects the surface acoustic wave after propagation through the substrate, and two pairs of electrical contacts 132, 134 for electrically connecting the IDTs 122, 124 to electrical components.

The SAW device 100 can include various piezoelectric substrates, such as a combination of one or more of 36° Y quartz, 36° YX lithium tantalate, 128° YX lithium niobate, langasite, langatate, langanite, lead zirconate titanate, cadmium sulfide, berlinite, lithium iodate, lithium tetraborate, or bismuth germanium oxide. In some embodiments, a SAW device 100 utilizes a single piezoelectric substrate to which the plurality of SAW sensors 102, 104, 106, 108, 110 is attached. In some embodiments, one or more of the SAW sensors 102, 104, 106, 108, 110 can utilize different piezoelectric substrates (e.g., a first SAW sensor 102 is attached to a first piezoelectric substrate and a second SAW sensor 104 is attached to a second piezoelectric substrate).

The transmitting IDT 122 (sometimes referred to as an input IDT) transduces or converts an excitation signal into a surface acoustic wave and transmits the surface acoustic wave into the piezoelectric substrate such that the surface acoustic wave propagates through the substrate, along a delay line 126. The excitation signal can be generated by hardware, such as a waveform generator as described herein, and can include a variety of signals including, but not limited to, pulse voltages, sinusoidal electrical signals, frequency modulation, linear frequency modulation, hyperbolic frequency modulation, orthogonal frequency coding, random modulation, continuous phase modulation, frequency shift key, multi-frequency shift key, phase shift key, wavelet modulation, etc. In some embodiments, each of the transmitting IDTs 122 of the SAW device 100 are excited simultaneously with a single excitation signal. For instance, the excitation signal can be received by an RF switch, which synchronizes the transmission across some or all of the transmitting IDTs 122. In some embodiments, at least some of the SAW sensors 102, 104, 106, 108, 110 are not excited simultaneously. For example, two or more of the SAW sensors 102, 104, 106, 108, 110 can be excited sequentially.

The transmitting IDT 122 can receive the excitation signal via the electrical contacts 132 (e.g., contact pads). For example, the SAW sensor 102 can include a first pair of electrical contacts 132 for receiving the excitation signal. The pair of electrical contacts 132 includes a positive and negative component that can be used for electrically connecting the transmitting IDT 122 with internal or external electrical components, such as a voltage source. For example, to generate a surface acoustic wave, a voltage source is connected to the transmitting IDT 122 through the electrical contacts 132, which includes a positive contact for connecting to a positive voltage of an excitation source and a negative contact for connecting to a negative voltage (e.g., an electrical ground of the system).

Once excited (e.g., when voltage or an excitation signal is applied), the array of transmitting IDTs generates a plurality of surface acoustic waves propagating through the substrate, along the delay lines 126 of each SAW sensor 102, 104, 106, 108, 110. As a non-limiting example, a first surface acoustic wave is generated and transmitted along a first delay line corresponding to SAW sensor 102, a second surface acoustic wave is generated and transmitted along a second delay line corresponding to SAW sensor 104, a third surface acoustic wave is generated and transmitted along a third delay line corresponding to SAW sensor 106, a fourth surface acoustic wave is generated and transmitted along a fourth delay line corresponding to SAW sensor 108, and a fifth surface acoustic wave is generated and transmitted along a fifth delay line corresponding to SAW sensor 110. The surface acoustic waves can have various frequencies. For instance, the frequency of a surface acoustic wave can be approximately 50, 100, 150, 200, 250, 300, 350, 400, 500, 600, 700, 800, 900, or 1000 MHz (+/− approximately 25 MHz). Similarly, the frequency of the surface acoustic waves can be less than 100 MHz, greater than 100 MHz, greater than 300 MHz, greater than 500 MHz, or greater than 1000 MHz.

In some instances, the frequency of the surface acoustic wave can at least partially depend on a type or composition of the piezoelectric substrate. For example, the frequency of the surface acoustic wave can be greater than 100 MHz for a SAW sensor having a piezoelectric substrate that excites pure or leaky shear-horizontal mode generation (non-limiting examples: 36° Y quartz, 36° YX lithium tantalate, langasite, langatate, langanite, lead zirconate titanate, cadmium sulfide, berlinite, lithium iodate, lithium tetraborate, and bismuth germanium oxide).

In some embodiments, the SAW device 100 includes a thin guiding layer (not shown) that confines the surface acoustic wave as it propagates through the substrate.

The receiving IDT 124 (sometimes referred to as an output IDT) receives a surface acoustic wave after a delay of some finite time (e.g., after the surface acoustic wave propagates from the transmitting IDT 122, through the delay line, to the receiving IDT 124). The receiving IDT 124 transduces the propagated surface acoustic wave (e.g., the surface acoustic wave after it propagates along the delay line 126) into a receiving signal (e.g., an electrical signal). As described herein, in some embodiments, all of the surface acoustic waves of the SAW device 100 can arrive at or reach a corresponding receiving IDT 124 at separate times due to the differing delay line lengths 112, 114, 116, 118, 120. For example, each of the transmitting IDTs 122 can simultaneously transmit a surface acoustic wave along a delay line 126. Because the delay line lengths 112, 114, 116, 118, 120 can be different for each SAW sensor 102, 104, 106, 108, 110, the surface acoustic waves require different periods of time to propagate across a corresponding delay line 126 before reaching a corresponding receiving IDT 124. Thus, the various delays of the receiving signals (or pulses of the receiving signal) can be based at least in part on a length variation between the delay lines 126 of the different SAW sensors 102, 104, 106, 108, 110.

The SAW device 100 can include an array of electrical contacts 132, 134 (e.g., contact pads) on each side of the delay lines 126. For example, a SAW sensor 102 can include two pairs of electrical contacts 132, 134, each pair having a positive and negative component. The positive and negative components can be used for IDT electrical connections with internal or external electrical components such as a voltage source or phase detection integrated circuit, to name a few. For example, to generate a surface acoustic wave, a voltage is connected to the transmitting IDT 122 through the electrical contacts 132, which includes a positive contact for connecting to a positive voltage of an excitation source and a negative contact for connecting to a negative voltage (e.g., an electrical ground of the system). Similarly, to receive the surface acoustic wave after it propagates through the substrate, the receiving IDT 124 includes or is connected to two contacts (positive and negative) for connecting with positive and negative electrodes of an external measurement system (such as an RF switch or an RF amplifier).

In some embodiments, the number of contacts 132, 134 increases proportionally as the number of SAW sensors 102, 104, 106, 108, 110 increases. For example, although the SAW device 100 is illustrated at including five SAW sensors 102, 104, 106, 108, 110, any number of SAW sensors can be utilized (e.g., 1, 2, 3, 4, 5, 6, 7, 8, 9, 10, or more). Thus, because the number of contacts can increase proportionally as the number of SAW sensors increases, the size or number of the contacts sometimes constitutes a limiting factor on the SAW device 100 size.

Accordingly, although not illustrated in FIG. 1A, in some embodiments, the contacts 132, 134 of some or each of the SAW sensors 102, 104, 106, 108, 110 of the multiplexing SAW device 100 are joined or connected together. This advantageously can result in a reduction in size of the multiplexing SAW device 100, a reduction in cost (e.g., since costs increase proportionally with chip size), or an increase in the number of possible SAW sensors 102, 104, 106, 108, 110 (thereby increasing the number of analytes which can be detected). For example, the positive contact pads of each of the transmitting IDTs can be joined together, and the negative contact pads of each of the transmitting IDTs can also be joined together. Similarly, the corresponding positive or negative contact pads of each of the receiving IDTs can be joined together. This connection can occur on the SAW device 100 itself (such as at the piezoelectric substrate with a multi-layer metallization process and common contact pads), or can occur off the SAW device 100 (such as with an external printed circuit board (PCB)). The connection of common contact pads (e.g., positive with positive, negative with negative) contributes to a reduction in the size of the SAW device 100 chip. For example, with reference to FIG. 1A, the total number of contacts of SAW device 100 for external connection can be reduced to four types (e.g., positive and negative contacts for transmitting IDTs 122, and positive and negative contacts for receiving IDTs 124). The total number of contacts can be reduced to four, irrespective of the number of SAW sensors in the SAW device 100.

Although the SAW sensors 102, 104, 106, 108, 110 are arranged in a sequencing format where the delay-line lengths 112, 114, 116, 118, 120 are gradually increased in size from a first sensor 102 to a last sensor 110, it should be noted that the SAW sensors 102, 104, 106, 108, 110 can be arranged in any sequence (e.g., no order corresponding to delay line length 112, 114, 116, 118, 120). In addition, although the delay-line length 112, 114, 116, 118, 120 of each SAW sensor 102, 104, 106, 108, 110 is different in the illustrated example, in some embodiments, one or more of the delay-line-lengths 112, 114, 116, 118, 120 can be the same.

In some embodiments, a delay line 126 includes an aluminum or gold layer, or a quidded layer with a polymer, SiO2, or ZnO. The delay lines are rendered biologically active by conjugating a layer of receptors such as antibodies, proteins, aptamers, or ligands that bind analytes from a fluid. Similarly, the sensor can detect chemicals in fluids through binding to a chemically sensitive interface.

In some embodiments, the delay line 126 (or a guiding layer, sensitive layer, or sensing area positioned on or near the delay line) provides a mechanism for attachment of an analyte (such as a biological or chemical analyte) from a medium (such as a liquid). For example, FIG. 1A illustrates a fluidic cell 128 which covers at least a portion of the array of SAW sensors 106 (e.g., a portion of the delay lines 126) and is configured to provide the delivery of analytes to the delay lines 126 or sensing area.

In some embodiments, a sensitive layer is attached to the surface of each of the SAW sensors (e.g., on the delay line 126), between the transmitting IDT 122 and receiving IDT 124. When the sensitive layer is exposed to an element (non-limiting examples: a gas, a chemical material, a biological material), the sensitive layer is altered such that it causes a quantifiable change in the propagating wave (e.g., in the amplitude, velocity, etc.). The change can be measured by, for example, detecting the variance of the excitation signal and the receiving signals in terms of amplitude, phase, frequency, or time-delay.

It some instances, it can be desirable to detect, monitor or measure multiple analytes simultaneously using a single SAW device. For example, detecting multiple analytes can be beneficial for biological material such as infectious disease diagnostics, or volatile organic compounds detection, to name a few. In some embodiments as described herein, multiple analytes can simultaneously be detected or measured by the SAW device 100. For example, the different delay-line lengths 112, 114, 116, 118, 120 of each SAW sensor 102, 104, 106, 108, 110 advantageously result in a time delay between receiving signals associated with the SAW sensors 102, 104, 106, 108, 110. By delaying the receiving signals such that they are each separated by a time delay, the SAW device 100 advantageously allows the testing of one or more analytes, for instance, in a sample media. For example, the receiving signals can be combined into a compressed pulse train. The pulses of the compressed pulse train each have a specific time delay corresponding to the length difference of delay lines. In some embodiments, phase or other information of the compressed pulse train can be extracted.

Figure 1B:
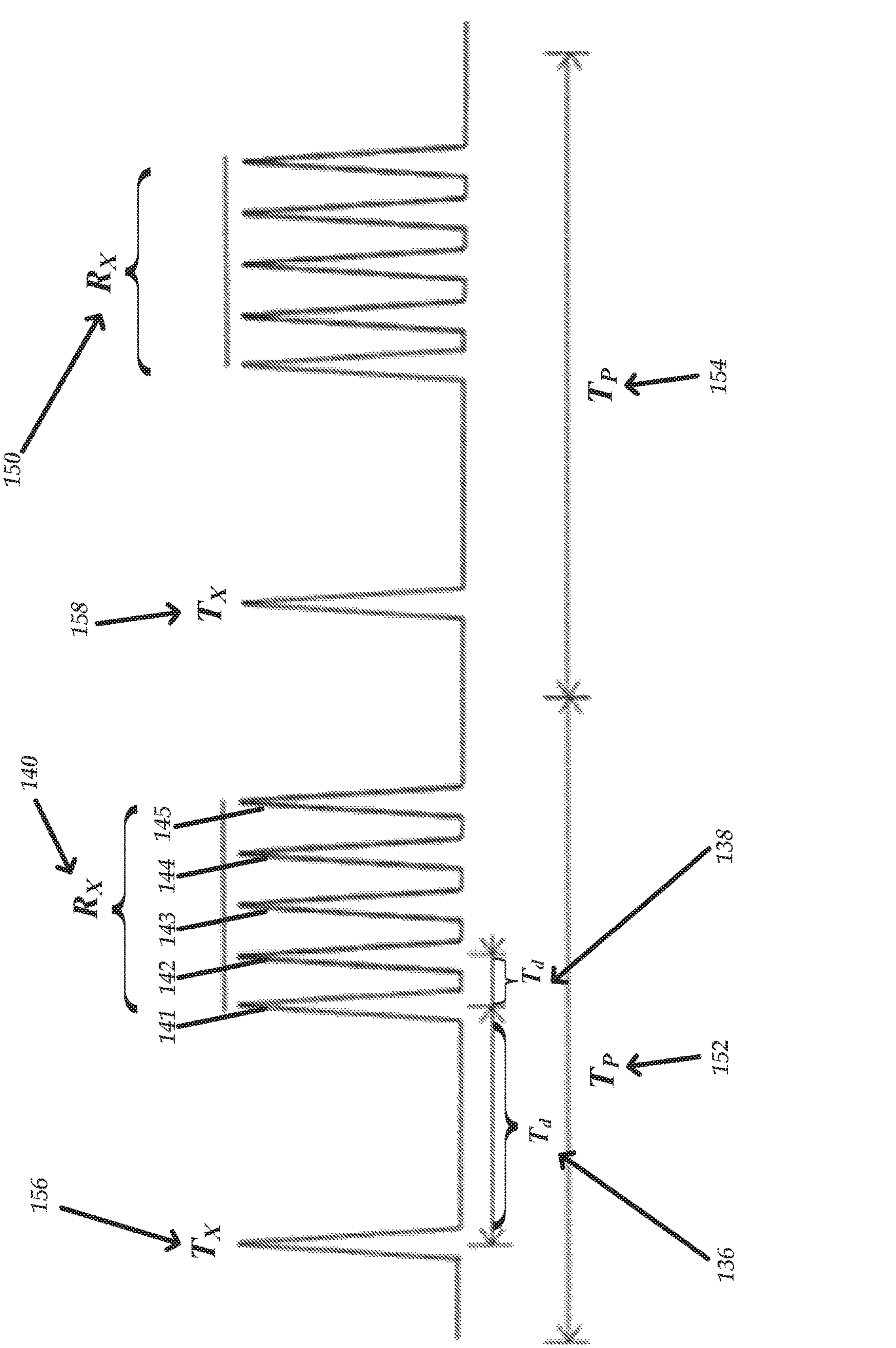
FIG. 1B illustrates time domain excitation signals and receiving signals corresponding to the SAW device of FIG. 1A, according to exemplary embodiments.

FIG. 1B illustrates time domain excitation signals (Tx) 156, 158 and receiving signals (Rx) 140, 150 corresponding to the SAW device 100 of FIG. 1A, according to some embodiments. As described herein, the SAW device 100 of FIG. 1A includes an array of five SAW sensors 102, 104, 106, 108, 110, each having a delay line 126 of different lengths 112, 114, 116, 118, 120. For example, the length of each delay line can be determined from Equation 1, below:

$$\text{Delay line length}=L_1+(n-1)*\Delta L$$

where $L_1$ is the length of the shortest delay line (e.g., length 112), n is a number corresponding to an order number of a SAW sensor when all of the SAW sensors 102, 104, 106, 108, 110 are sorted from shortest delay line to longest delay line (e.g., n=1 for SAW sensor 102 having the shortest delay line 112, n=2 for the SAW sensor having the next shortest delay line 114, n=5 for SAW sensor 110 having the longest delay line 120), and ΔL 130 is the difference in delay line length between subsequent SAW sensors when the SAW sensors 102, 104, 106, 108, 110 are ordered by delay line length. It should be noted, however, that although each of the delay line lengths 112, 114, 116, 118, 120 are different by a factor of ΔL 130 in the illustrated example, the delay lines 126 can have any length and are therefore not required to increase in a lock-step or other patterned manner. Thus, it follows that Equation 1 for determining length of a delay line may change depending on the specific delay line lengths. Alternatively, it might be the case that no equation for determining each of the delay line lengths 112, 114, 116, 118, 120 is available. In some embodiments, the delay line lengths are stored in memory. In some embodiments, the delay line lengths are predetermined.

With continued reference to FIGS. 1A and 1B, an excitation signal (Tx) 156 is received by the SAW device 100 and each of the SAW sensors 102, 104, 106, 108, 110 are simultaneously excited. In this example, the excitation signal (Tx) 156 is a pulse voltage. However, as described herein, the excitation signal (Tx) 156 can be one or more of various signals. For example, the excitation signal (Tx) 156 can be a frequency-modulated signal that covers a spectrum of frequency. In some embodiments, the frequency-modulated signal can advantageously provide a higher power gain than can an excitation signal at a fixed frequency.

The excitation signal (Tx) 156 excites the arrays of transmitting IDTs 122 and generates an array of surface acoustic waves, which propagate along the delay line 126 of each SAW sensor 102, 104, 106, 108, and 110. The receiving IDTs 124 receive the propagated surface acoustic waves and convert the surface acoustic waves into pulses 141, 142, 143, 144, 145 of receiving signals (Rx) 140, 150. As described herein, the delay-line lengths 112, 114, 116, 118, 120 of each SAW sensor 102, 104, 106, 108, 110 are different. Thus, the surface acoustic waves will reach the various receiving IDTs 124 at various times. Accordingly, the individual pulses 141, 142, 143, 144, 145 of the receiving signal (Rx) 140 are each delayed by a different period of time, which corresponds to the different lengths 112, 114, 116, 118, 120 of the delay lines 126. This delay in time between the individual pulses 141, 142, 143, 144, 145 of the receiving signal (Rx) 140 occurs even though the SAW sensors 102, 104, 106, 108, 110 are excited simultaneously.

Stated another way, the SAW sensors 102, 104, 106, 108, 110 generate a pulse train of electrical signals 141, 142, 143, 144, 145 due to the propagation delay of different lengths 112, 114, 116, 118, 120 of the delay lines 126. With respect to the example of FIG. 1B, the time delay ($T_d$) 136 between the excitation pulse (Tx) 156 and the first pulse 141 of the receiving signal (Rx) 140 (e.g., the pulse 141 corresponding to the SAW sensor 102 having the delay line 126 with the shortest length 112) is given by Equation 2, below:

$$T_d=L_1/V$$

where $L_1$ is the delay line length of the shortest delay line (e.g., length 112), and v is the surface acoustic wave velocity, wherein the surface acoustic wave velocity (v) of a wave is the rate at which the surface acoustic wave propagates in a particular space (e.g., through a substrate).

The time delay ($\Delta T_d$) 138 between each of the subsequent pulses 141, 142, 143, 144, 145 of the receiving signal (Rx) 140 is given by Equation 3, below:

$$\Delta T_d=\Delta L/v$$

where ΔL 130 is the difference in delay line length between subsequent SAW sensors when the SAW sensors 102, 104, 106, 108, 110 are ordered by delay line length, and v is the surface acoustic wave velocity.

The time delay ($T_d$) 136 between the first pulse 141 and the excitation signal 156 can be measured in variety of ways. For example, the time delay ($T_d$) 136 can correspond to the time difference between the center, beginning, end or each pulse. In some instances, the time delay ($T_d$) 136 can correspond to the time difference between a corresponding region of each of the pulses 141, 156. The time delay ($\Delta T_d$) 138 can be determined using similar techniques.

As a non-limiting example, a sensor has a shortest delay line length (L) (e.g., delay length 112 of SAW sensor 102) of 4 mm and is attached to a 36° LiTaO3 piezoelectric substrate. A surface acoustic wave traveling through a 36° LiTaO3 piezoelectric substrate has a velocity (v) of 4212 m/sec. Thus, the delay line of the shortest length ($L_1$) 112 will delay the first pulse 141 approximately 0.95 μs for unidirectional SAW sensors. In addition, with a difference of delay line length (ΔL) 130 of approximately 0.3 mm, the time delay ($\Delta T_d$) between each receiving pulse 141, 142, 143, 144, 145 of the receiving signal (Rx) 140 is approximately 71 ns.

In some embodiments, the SAW sensors 102, 104, 106, 108, 110 are continuously excited at a constant period ($T_p$) 152, 154 (e.g., at intervals of 10, 20, 30, 40, 50, 100, 200, 400, or 500 μs) to generate multiple receiving signals (Rx) 140, 150. In examples such as these, the receiving signals (Rx) 140, 150 (e.g., the pulses 141, 142, 143, 144, 145 in the receiving signals 140, 150) can be averaged to, for example, determine a receiving signal (Rx) having reduced receiving noise. In some embodiments, the time delays (e.g., $T_d$, $\Delta T_d$) can be on the order of ns to μs.

Bi-Directional SAW Sensors

Figure 2A:
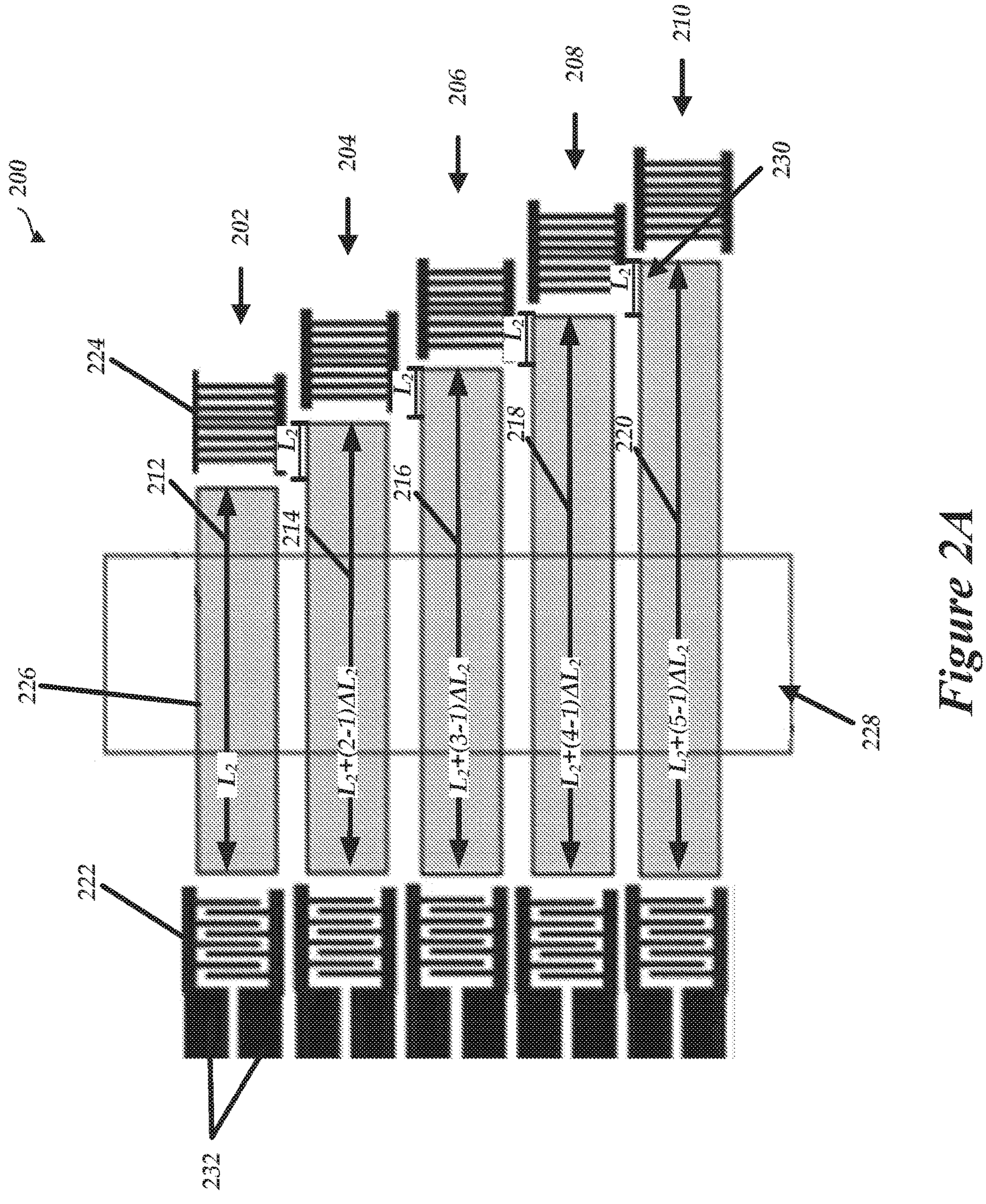
FIG. 2A is a diagram of a Surface Acoustic Wave (SAW) device, according to exemplary embodiments.

FIG. 2A is a diagram of a surface acoustic wave (SAW) device 200, according to some embodiments. The multiplexing SAW device 200 includes a piezoelectric substrate (not illustrated) and an array of SAW sensors 202, 204, 206, 208, 210, wherein the delay-line lengths 212, 214, 216, 218, 220 of each SAW sensor 202, 204, 206, 208, 210 are different. In some instances herein, the SAW device 200 will be described with respect to sensor 202. Each of the other SAW sensors 204, 206, 208, 210 can have components or features similar or different to those described with respect to SAW sensor 202.

SAW sensor 202 can include a transmitting/receiving IDT 222 that transmits a surface acoustic wave into the piezoelectric substrate and detects a reflected SAW. The SAW sensor 202 can also include a reflector 224, which reflects the SAW back towards the transmitting/receiving IDT 222, and a pair of electrical contacts 232 for IDT electrical connections.

The SAW device 200 can include various piezoelectric substrates, such as a combination of one or more of 36° Y quartz, 36° YX lithium tantalate, 128° YX lithium niobate, langasite, langatate, langanite, lead zirconate titanate, cadmium sulfide, berlinite, lithium iodate, lithium tetraborate, or bismuth germanium oxide. In some embodiments, a multiplexing SAW device 200 utilizes a single piezoelectric substrate on which the plurality of SAW sensors 202, 204, 206, 208, 210 rest. In some embodiments, one or more of the SAW sensors 202, 204, 206, 208, 210 can utilize different piezoelectric substrates (e.g., a first SAW sensor 202 resides on a first piezoelectric substrate and a second SAW sensor 204 resides on a second piezoelectric substrate).

The transmitting/receiving IDT 222 transduces or converts the excitation signal into a surface acoustic wave and transmits the surface acoustic wave into the piezoelectric substrate such that the surface acoustic wave propagates through the substrate, along a delay line 226. The excitation signal can include a variety of signals including, but not limited to, a pulse voltage, a frequency modulated signal, a sinusoidal electrical signal, etc. In some embodiments, each of the transmitting IDTs of the SAW sensors 202, 204, 206, 208, 210 within the SAW device 200 are excited simultaneously with an excitation signal, for instance, using an RF switch to synchronize the transmission. In some embodiments, at least some of the SAW sensors 202, 204, 206, 208, 210 are not excited simultaneously (for example, the SAW sensors 202 and 204 can be excited sequentially).

The transmitting/receiving IDT 222 can receive the excitation signal via an array of electrical contacts 232 (e.g., contact pads). For example, the SAW sensors 202 can include a pair of electrical contacts 232 for receiving the excitation signal. The pair of electrical contacts 232 includes a positive and negative component that can be used for electrically connecting the transmitting/receiving IDT 222 with internal or external electrical components, such as a voltage source. For example, to generate a surface acoustic wave, a voltage is connected to the transmitting/receiving IDT 222 through the electrical contacts 232, which includes a positive contact for connecting to a positive voltage of an excitation source and a negative contact for connecting to a negative voltage (e.g., an electrical ground of the system). The contacts 232 can also be utilized for connecting with positive and negative electrodes of an external measurement system (such as an RF switch or an RF amplifier).

Once excited, the array of transmitting/receiving IDTs generates an array of surface acoustic waves propagating through the substrate, along the delay lines 226 of each SAW sensor 202, 204, 206, 208, 210. The surface acoustic waves can have various frequencies. For instance, the frequency of a surface acoustic wave can be approximately 50, 100, 150, 200, 250, 300, 350, 400, 500, 600, 700, 800, 900, or 1000 MHz (+/− approximately 25 MHz). Similarly, the frequency of a surface acoustic wave can be less than 100 MHz, greater than 100 MHz, greater than 300 MHz, greater than 500 MHz, or greater than 1000 MHz.

In some instances, the frequency of the surface acoustic wave can at least partially depend on a type or composition of the piezoelectric substrate. For example, the frequency of the surface acoustic wave can be greater than 100 MHz for SAW sensor 206 having a piezoelectric substrate that excites pure or leaky shear-horizontal mode generation (non-limiting examples: 36° Y quartz, 36° YX lithium tantalate, langasite, langatate, langanite, lead zirconate titanate, cadmium sulfide, berlinite, lithium iodate, lithium tetraborate, and bismuth germanium oxide).

In some embodiments, multiplexing SAW device 200 includes a thin quidding layer (not shown) that confines the surface acoustic wave as it propagates through the substrate.

The transmitting/receiving IDT 222 also receives the surface acoustic after the surface acoustic reflects off reflector 224 and the surface acoustic wave propagates back through the substrate. The transmitting/receiving IDT 222 transduces the propagated acoustic wave into a receiving signal. In some embodiments, each of the plurality of surface acoustic waves arrives at or reaches the plurality of transmitting/receiving IDTs at separate times. For example, as described above, each of the transmitting/receiving IDTs can simultaneously transmit a surface acoustic wave into the substrate. Because the lengths 212, 214, 216, 218, 220 of the delay lines of the SAW sensors 202, 204, 206, 208, 210 are different for each SAW sensor 202, 204, 206, 208, 210, the surface acoustic waves propagate across different delay line lengths and reach each of the transmitting/receiving IDTs at various times, based on the length variation of delay line. A compressed pulse train can be generated from the receiving signals. Pulses of the compressed pulse train can have a specific time delay corresponding to the length difference of delay lines. In some embodiments, phase or other information of the compressed pulse train can be extracted.

The SAW device 200 includes an array of electrical contacts 232 (e.g., contact pads) on each side of the delay lines 226. For example, each of the SAW sensors 202, 204, 206, 208, 210 can include a pair of electrical contacts 232 each pair having a positive and negative component. The positive and negative components can be used for IDT electrical connections with internal or external electrical components such as a voltage source or phase detection integrated circuit, to name a few. For example, to generate a surface acoustic wave, a voltage is connected to the transmitting/receiving IDT 222 through the electrical contacts 232, which includes a positive contact for connecting to a positive voltage of an excitation source and a negative contact for connecting to a negative voltage (e.g., an electrical ground of the system). Similarly, the positive and negative contacts of the transmitting/receiving IDT 222 can connect with positive and negative electrodes of an external measurement system (such as an RF switch or an RF amplifier).

In some embodiments, the number of contacts 232 increases proportionally as the number of SAW sensors 202, 204, 206, 208, 210 increases. For example, although the SAW device 200 is illustrated at including five SAW sensors 202, 204, 206, 208, 210, any number of SAW sensors can be utilized (e.g., 1, 2, 3, 4, 5, 6, 7, 8, 9, 10, or more). Thus, because the required number of contact can increase proportionally as the number of SAW sensors increases, the size or number of the contact sometimes constitutes a limiting factor on the device size.

Accordingly, although not illustrated in FIG. 2A, in some embodiments, the contact pads of some or each of the SAW sensors 202, 204, 206, 208, 210 of the multiplexing SAW device 200 are joined or connected together. This advantageously can result in a reduction in size of the SAW device 200, a reduction in cost (e.g., since costs increase proportionally with chip size), or an increase in the number of possible SAW sensors (thereby increasing the number of analytes which can be detected). For example, the positive contact pads of each of the transmitting/receiving IDTs can be joined together, and the negative contact pads of each of the transmitting/receiving IDTs can also be joined together. This connection can occur on the SAW device 200 itself (such as at the piezoelectric substrate with a multi-layer metallization process and common contact pads), or can occur off the SAW device 200 (such as with an external printed circuit board (PCB)). The connection of common contacts (e.g., positive with positive, negative with negative) contributes to a reduction in the size of the sensor chip. For example, the number of contacts for external connection can be reduced to two types (e.g., positive and negative contacts for the transmitting/receiving IDTs), irrespective of the number of SAW sensors 202, 204, 206, 208, 210 in the multiplexing SAW device 200.

The different delay-line lengths 212, 214, 216, 218, 220 of each SAW sensor 202, 204, 206, 208, 210 cause the surface acoustic waves to reach the transmitting/receiving IDTs 222 at separate times. Thus, a receiving signal from each SAW sensor is delayed at various times, based on the length variation of delay line. A compressed pulse train can be generated with a specific time delay according to the length difference of delay lines. Phase or other information of the compressed pulse can be extracted.

Although the SAW sensors 202, 204, 206, 208, 210 are arranged in a sequencing format where the delay-line lengths 212, 214, 216, 218, 220 are gradually increased from a first sensor to a last sensor, it should be noted that the SAW sensors 202, 204, 206, 208, 210 can be arranged in any sequence (e.g., no order corresponding to delay line length 212, 214, 216, 218, 220). In addition, although the delay-line length 212, 214, 216, 218, 220 of each SAW sensor 202, 204, 206, 208, 210 is different in the illustrated example, in some embodiments, one or more of the delay-line-lengths can be the same.

In some embodiments, a delay line 226 includes an aluminum or gold layer, or a quidded layer with a polymer, SiO2, or ZnO. The delay lines are rendered biologically active by conjugating a layer of receptors such as antibodies, proteins, aptamers, or ligands that bind analytes from a fluid. Similarly, the sensor can detect chemicals in fluids through binding to a chemically sensitive interface.

In some embodiments, the delay line 226 (or a guiding layer, sensitive layer, or sensing area positioned on the delay line) provides a mechanism for attachment of an analyte (such as a biological or chemical analyte) from a medium (such as a liquid). For example, FIG. 2A illustrates a fluidic cell 228 which covers at least a portion of the array of SAW sensors 202, 204, 206, 208, 210 (e.g., a portion of the delay lines 226) and is configured to provide the delivery of analytes to the delay lines 226 or sensing area.

In some embodiments, a sensitive layer resides on the surface of each of the SAW sensors 202, 204, 206, 208, 210 (e.g., on the delay line 226), between the transmitting/receiving IDT 222 and the reflector 224. When the sensitive layer is exposed to an element (non-limiting examples: a gas, a chemical material, a biological material), the sensitive layer is altered such that it causes a quantifiable change in the propagating wave (e.g., in the amplitude, velocity, etc.). The change can be measured by detecting the variance of input and output electrical signals, for instance, in terms of amplitude, phase, frequency, or time-delay.

It some instances, it can be desirable to detect, monitor or measure multiple analytes simultaneously using a single SAW device. For example, a single SAW device may be more time-efficient. In addition, detecting multiple analytes can be beneficial for biological material such as infectious disease diagnostics, or volatile organic compounds detection, to name a few. In some embodiments as described herein, multiple analytes can simultaneously be detected or measured by the SAW device 200. For example, the different delay-line lengths 212, 214, 216, 218, 220 of each SAW sensor 202, 204, 206, 208, 210 advantageously result in a time delay between receiving signals associated with the SAW sensors 202, 204, 206, 208, 210. By delaying the receiving signals such that they are each separated by a time delay, the SAW device 200 advantageously allows the testing of multiple analytes. For example, the receiving signals can be combined into a compressed pulse train. The pulses of the compressed pulse train each have a specific time delay corresponding to the length difference of delay lines. In some embodiments, phase or other information of the compressed pulse train can be extracted.

Figure 2B:
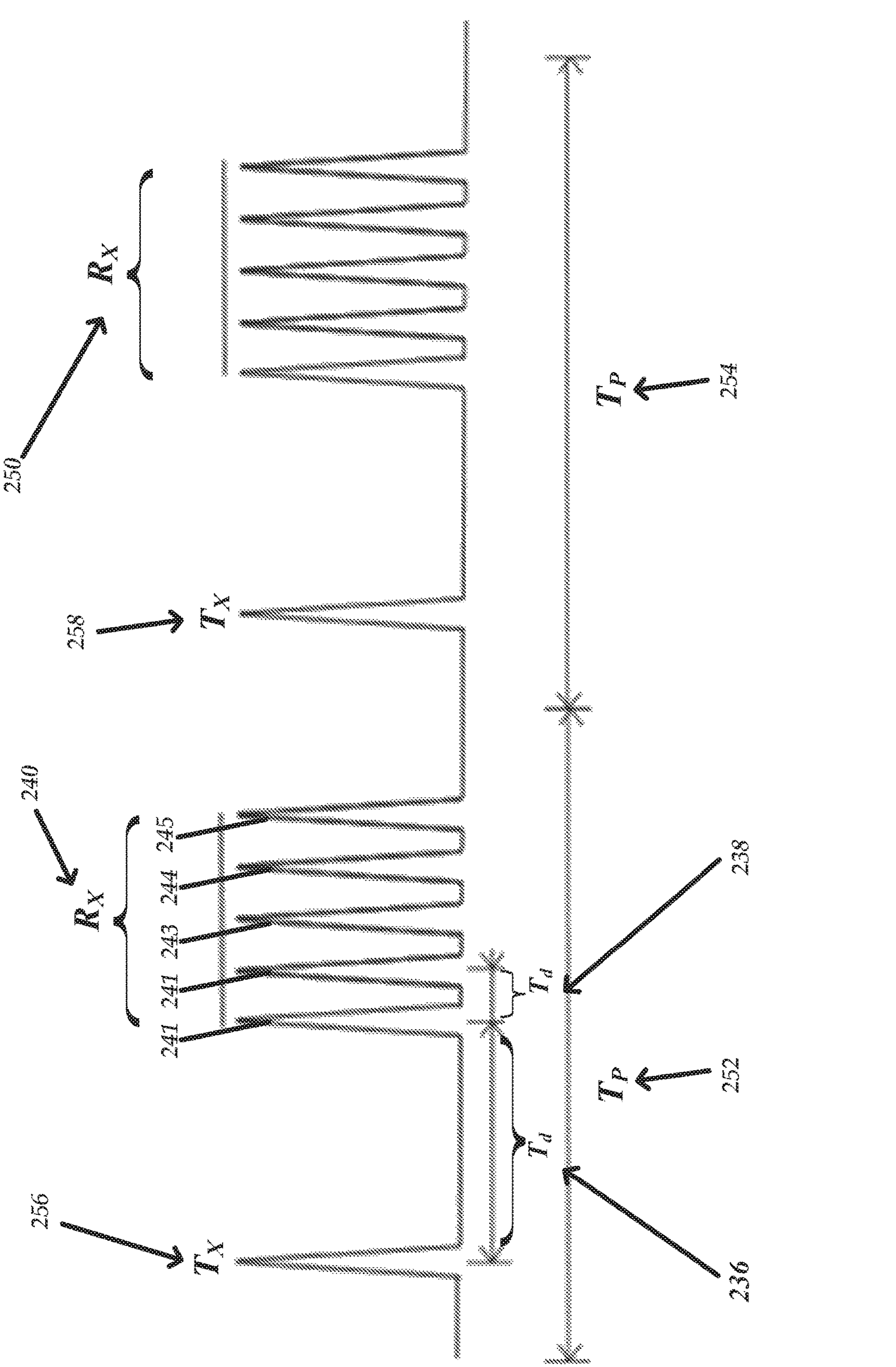
FIG. 2B illustrates time domain excitation signals and receiving signals corresponding to the SAW device of FIG. 2A, according to exemplary embodiments.

FIG. 2B illustrates time domain excitation signals (Tx) 256, 258 and receiving signals (Rx) 240, 250 corresponding to the SAW device 200 of FIG. 2A, according to some embodiments. As described herein, the SAW device 200 of FIG. 2A includes an array of five SAW sensors 202, 204, 206, 208, 210, each having a delay line 226 of a different length 212, 214, 216, 218, 220. For example, the length of each delay line can be determined from Equation 4, below:

$$L_2+(n-1)*\Delta L_2$$

where $L_2$ is the length of the shortest delay line (e.g., length 212), n is a number corresponding to an order number of a SAW sensor when all of the SAW sensors 202, 204, 206, 208, 210 are sorted from shortest delay line to longest delay line (e.g., n=1 for SAW sensor 202 having the shortest delay line 212, n=2 for the SAW sensor having the next shortest delay line 214, n=5 for SAW sensor 210 having the longest delay line 220), and $\Delta L$ is the difference in delay line length between subsequent SAW sensors when the SAW sensors 202, 204, 206, 208, 210 are ordered by delay line length. It should be noted, however, that although each of the delay line lengths 212, 214, 216, 218, 220 are different by a factor of $\Delta L_2$ 230 in the illustrated example, the delay lines 226 can have any length and are therefore not required to increase in a lock-step or other patterned manner. Thus, it follows that Equation 4 for determining length of a delay line may change depending on the specific delay line lengths. Alternatively, it might be the case that no equation for determining each of the delay line lengths 212, 214, 216, 218, 220 is available.

With continued reference to FIGS. 2A and 2B, an excitation signal (Tx) 256 is received by the SAW device 200 and each of the SAW sensors 102, 104, 106, 108, 210 are simultaneously excited. In this example, the excitation signal (Tx) 256 is a pulse voltage. However, as described herein, the excitation signal (Tx) 256 can be one or more of various signals. For example, the excitation signal (Tx) 256 can be a frequency-modulated signal that covers a spectrum of frequency. In some embodiments, the frequency-modulated signal can advantageously provide a higher power gain than can an excitation signal at a fixed frequency.

The excitation signal (Tx) 256 excites the array of transmitting/receiving IDTs 222, which generate an array of surface acoustic waves. The surface acoustic waves propagate along the delay line 226 of each SAW sensor 202, 204, 206, 208, and 210 before reaching a reflector 224. The reflectors 224 echo or reflect the surface acoustic waves back along the delay line. The surface acoustic waves again propagate through the delay line 226, before being received by the transmitting/receiving IDTs 222, which generate receiving signals (e.g., by transducing a surface acoustic wave into an electrical signal). The transmitting/receiving IDTs 222. It should be noted that, in some instances, a reflective delay line SAW sensor (e.g., a SAW sensor having reflectors), can include multiple IDTs (e.g., a transmitting IDT and a receiving IDT) or a single IDT that transmits and receives.

The transmitting/receiving IDTs 222 receive the propagated surface acoustic waves and convert the surface acoustic waves into pulses 241, 242, 243, 244, 245 of receiving signals (Rx) 240, 250. As described herein, the delay-line lengths 212, 114, 216, 218, 220 of each SAW sensor 202, 204, 206, 208, 210 are different. Thus, the surface acoustic waves will reach the various receiving IDTs 222 at various times. Accordingly, the individual pulses 241, 242, 243, 244, 245 of the receiving signal (Rx) 240 are each delayed by a different period of time, which corresponds to the different lengths 212, 214, 216, 218, 220 of the delay lines 226. This delay in time between the individual pulses 241, 242, 243, 244, 245 of the receiving signal (Rx) 240 occurs even though the SAW sensors 202, 204, 206, 208, 210 are excited simultaneously.

Stated another way, the SAW sensors 202, 204, 206, 208, 210 generate a pulse train of electrical signals 241, 242, 243, 244, 245 due to the propagation delay of different lengths, 212, 214, 216, 218, 220 of the delay lines 226. With respect to the example of FIG. 2B, the time delay ($T_d$) 236 between the excitation pulse (Tx) 256 and the first pulse 241 of the receiving signal (Rx) 240 (e.g., the pulse 241 corresponding to the SAW sensor 202 having the delay line 226 with the shortest length 212) is given by Equation 5, below:

$$T_d = 2 * L_2 / v$$

where $L_2$ is the delay line length of the shortest delay line (e.g., length 212), and v is the surface acoustic wave velocity. Because the surface acoustic wave propagates the delay line twice, the delay time ($T_d$) 236 is double the time delay ($T_d$) 136 of the SAW device 100 (having unidirectional SAW sensors), even though the delay lines lengths are the same (see e.g., FIGS. 1B and 2B).

The different in time delay ($\Delta T_d$) 238 between the each of the subsequent pulses 241, 242, 243, 244, 245 of the receiving signal (Rx) 240 is given by Equation 6, below:

$$\Delta T_d = 2 * \Delta L_2 / v$$

where $\Delta L_2$ is the difference in delay line length between subsequent SAW sensors when the SAW sensors 202, 204, 206, 208, 210 are ordered by delay line length, and v is the surface acoustic wave velocity. Because the surface acoustic wave propagates the delay line twice, the difference in delay time ($\Delta T_d$) 238 is double the difference in time delay ($\Delta T_d$) 138 of the SAW device 100 (having unidirectional SAW sensors), even though the delay lines lengths are the same.

The time delay ($T_d$) 236 between the first pulse 241 and the excitation signal 256 can be measured in variety of ways. For example, the time delay ($T_d$) 236 can correspond to the time difference between the center, beginning, end or each pulse. In some instances, the time delay ($T_d$) 236 can correspond to the time difference between a corresponding region of each of the pulses 241, 256. The time delay ($\Delta T_d$) 238 can be determined using similar techniques.

As a non-limiting example, a sensor has a shortest delay line length (L) (e.g., delay length 212 of SAW sensor 202) of 4 mm and is attached to a 36° LiTaO3 piezoelectric substrate. A surface acoustic wave traveling through a 36° LiTaO3 piezoelectric substrate has a surface acoustic wave velocity (v) of 4212 m/sec. Thus, the delay line of the shortest length ($L_2$) 212 will delay the first pulse 241 approximately 1.9 μs for unidirectional SAW sensors. In addition, as shown in FIG. 2A, with a difference of delay line length ($\Delta L_2$) 230 of approximately 0.3 mm, the time delay ($\Delta T_d$) 238 between each receiving pulse 241, 242, 243, 244, 245 of the receiving signal (Rx) 240 is approximately 142 ns.

In some embodiments, the SAW sensors 202, 204, 206, 208, 210 are continuously excited at a constant period ($T_p$) 252, 254 (e.g., at intervals of 10, 20, 30, 40, 50, 100, 200, 400, or 500 μs) to generate multiple receiving signals (Rx) 240, 250. In examples such as these, the receiving signals (Rx) 240, 250 (e.g., the pulses 241, 242, 243, 244, 245 in the receiving signals 240, 250) can be averaged to, for example, determine a receiving signal (Rx) having reduced receiving noise. In some embodiments, the time delays (e.g., $T_d$, $\Delta T_d$) can be on the order of ns to μs.

Figures 3A, 3B:
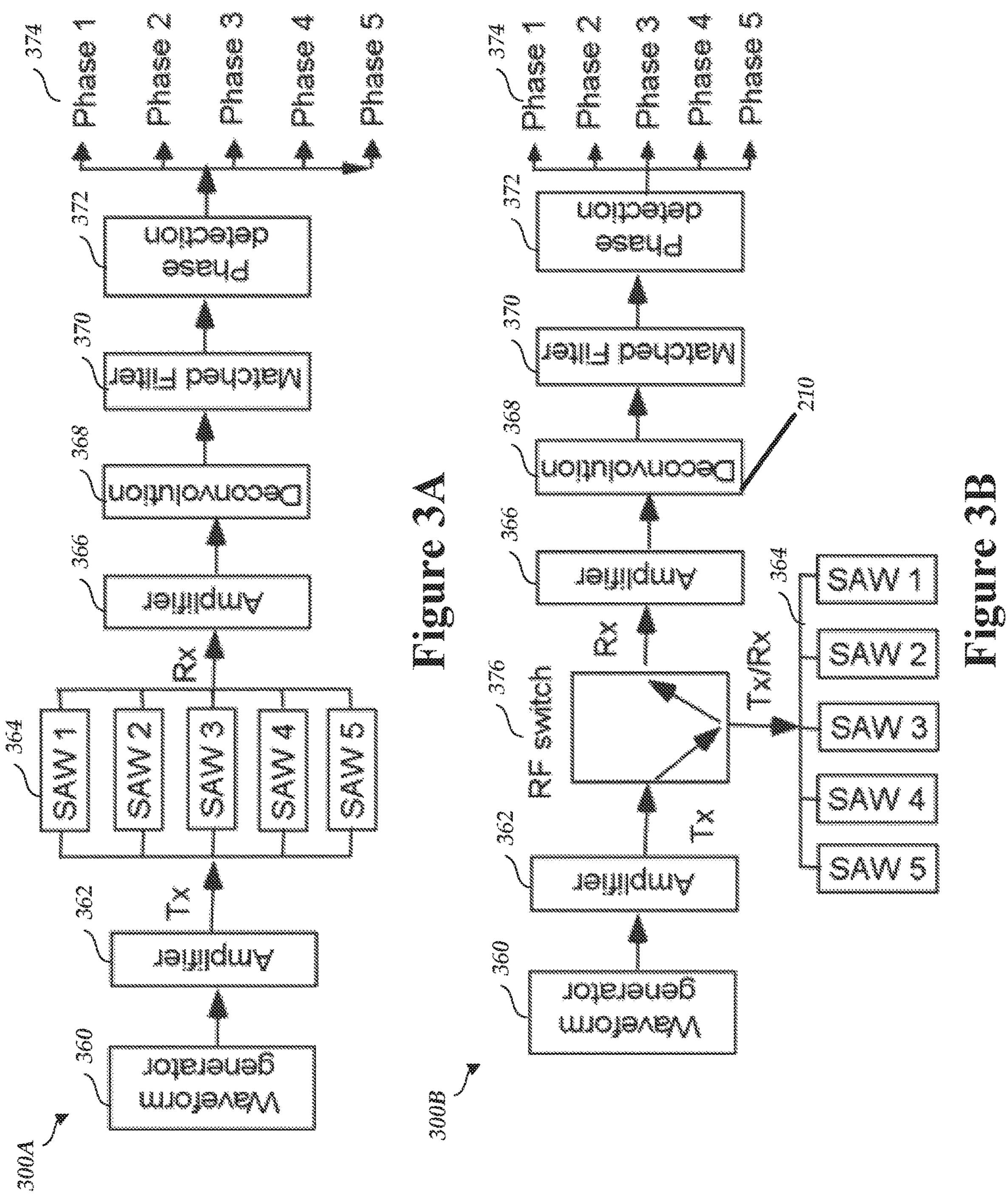
FIGS. 3A-3C illustrate block diagrams of a multiplexing SAW measurement system, according to exemplary embodiments.
Figure 3C:
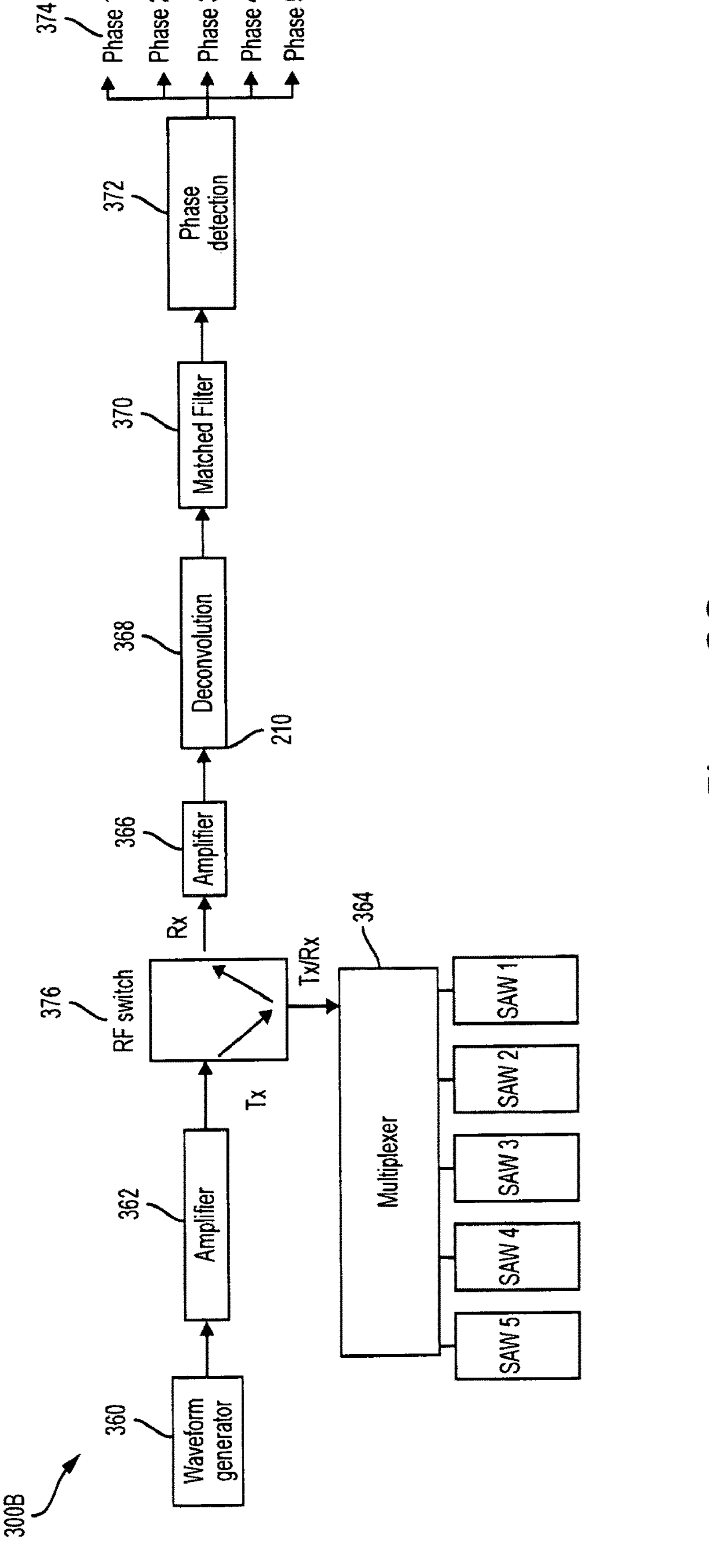

FIGS. 3A-3B illustrate block diagrams of a multiplexing SAW measurement system, according to some embodiments. The multiplexing SAW measurement system 300A of FIG. 3A includes a waveform generator 360, a first amplifier 362, an array of SAW sensors 364, a second amplifier 366, a deconvolution module 368, a filter module 370, and a phase detection module 372. The multiplexing SAW measurement system 300B of FIG. 3B further includes an RF switch 376.

The waveform generator 360 generates an excitation signal. For example, the excitation signal can include a pulse voltage (e.g., as illustrated in FIGS. 1B and 2B), a frequency modulated signal (e.g., linear frequency modulation, hyperbolic frequency modulation, etc.), a chirp signal, etc. In some embodiments, the waveform generator can be controlled by a controller which may include one or more hardware processors (non-limiting example, a start button). The waveform generator 360 can generate signals at any one of a number of frequencies. For example, the waveform generator 360 can generate signals at a frequency of approximately 50, 100, 150, 200, 250, 300, 350, 400, 500, 600, 700, 800, 900, or 1000 MHz (+/− approximately 25 MHz). In addition or alternatively, the waveform generator can generate a frequency modulated signal coving a spectrum of frequency. In some instances, a spectrum of frequency has a higher power gain than a fixed frequency.

The first amplifier 362 amplifies the excitation signal generated by the waveform generator 360. In some embodiments, the amplifier 362 is a radio frequency amplifier (RF amplifier).

The amplified excitation signal is applied to the array of SAW sensors 364. The array of SAW sensors 364 can be similar to any of the SAW sensors as described herein. For example, the array of SAW sensors 364 can include SAW sensors with transmission delay lines (e.g., as described with respect to FIG. 1A), such that the SAW sensors include a transmission IDT opposite a receiving IDT. The SAW sensors can additional or alternatively the array of SAW sensors 364 can include SAW sensors with reflective delay lines (e.g., as described with respect to FIG. 2A), such that the SAW sensors include a transmission/receiving IDT opposite a reflector. As described herein, each of the SAW sensors of the array 364 can have a delay line of a different length. The excitation signal is received by the array of SAW sensors 364 and the array of SAW sensors 364 generate a receiving signal ($R_x$), such as the receiving signal ($R_x$) 140, 240 described with respect to FIGS. 1B and 2B.

In some embodiments, as illustrated in FIG. 3B, the system 300B can include an RF switch 376 to simultaneously apply the excitation signal to each of the SAW sensors. For example, the RF switch 376 can synchronize the excitation signals to the sensor array 364. By synchronizing the excitation signals to the sensor array 364, the resulting phase detection (as described below) can provide a more accurate measurement, as compared to non-synchronized excitation of the sensor array 364.

A second amplifier 366 amplifies the received signal ($R_x$) generated by the array of SAW sensors 364. In some embodiments, the amplifier 366 is an RF amplifier. The received signal (Rx) is further processed with signal deconvolution 368 and then match filtered 370 to produce a compressed pulse train.

The signal deconvolution 368 can, for example, be utilized to reverse the effects of physical or chemical interferences that affected the surface acoustic wave during propagation. For example, physical or chemical interferences (e.g., associated with environmental temperature, viscosity, stress, pressure, velocity, etc.) might affect the propagation of the surface acoustic wave, thereby altering the receiving signals. In some instances (e.g., as described with respect to FIG. 4) a reference channel can be utilized to measure physical or chemical interferences that are not associated with the analyte to be measured. By measuring or determining the physical chemical interferences, the receiving signals can be adjusted during signal deconvolution 368 to remove alternations that may have been caused by the interferences.

As described herein, the received signal ($R_x$) includes a plurality of pulses or signals which correspond to each of the SAW sensors of the array of SAW sensors 364. A pulse can be used to determine variance in at least one of amplitude, phase, frequency, or time-delay between another pulse and/or the excitation signal. For example, the multiplexing SAW measurement system 300A, 300B includes phase detection 372 which can determine a phase 374 corresponding to each of the plurality of pulses with respect to each other and/or the excitation signal. For example, the difference in delay line length between the SAW sensors results in a time delay between the pulses of the received signal ($R_x$). The shifts in time domain between the pulses of the compressed pulse train correspond to phase shifts associated with a particular SAW sensor. The phase shifts can be determined, for example, using a software program, field programmable gate array (FPGA) hardware, a hardware processor, and the like.

The resulting system 300A, 300B offers the advantage of simultaneous excitation and sensing. Measurement of the received sensor signal ($R_x$) in a matched filter system allows for sensing of multiple targets or bio-agents simultaneously. An individual sensor can thus indicate the presence of an individual substance to which it reacts specifically. An indication regarding the amount of the substance present can be provided by the phase change of the measurement signal. As a whole, the sensor chip (e.g., the SAW device 100, SAW device 200, array of SAW Sensors 364) thus forms a detector with its multiple individual sensor elements, the detector being able to simultaneously identify a large number of various substances during a single test procedure.

Figure 4:
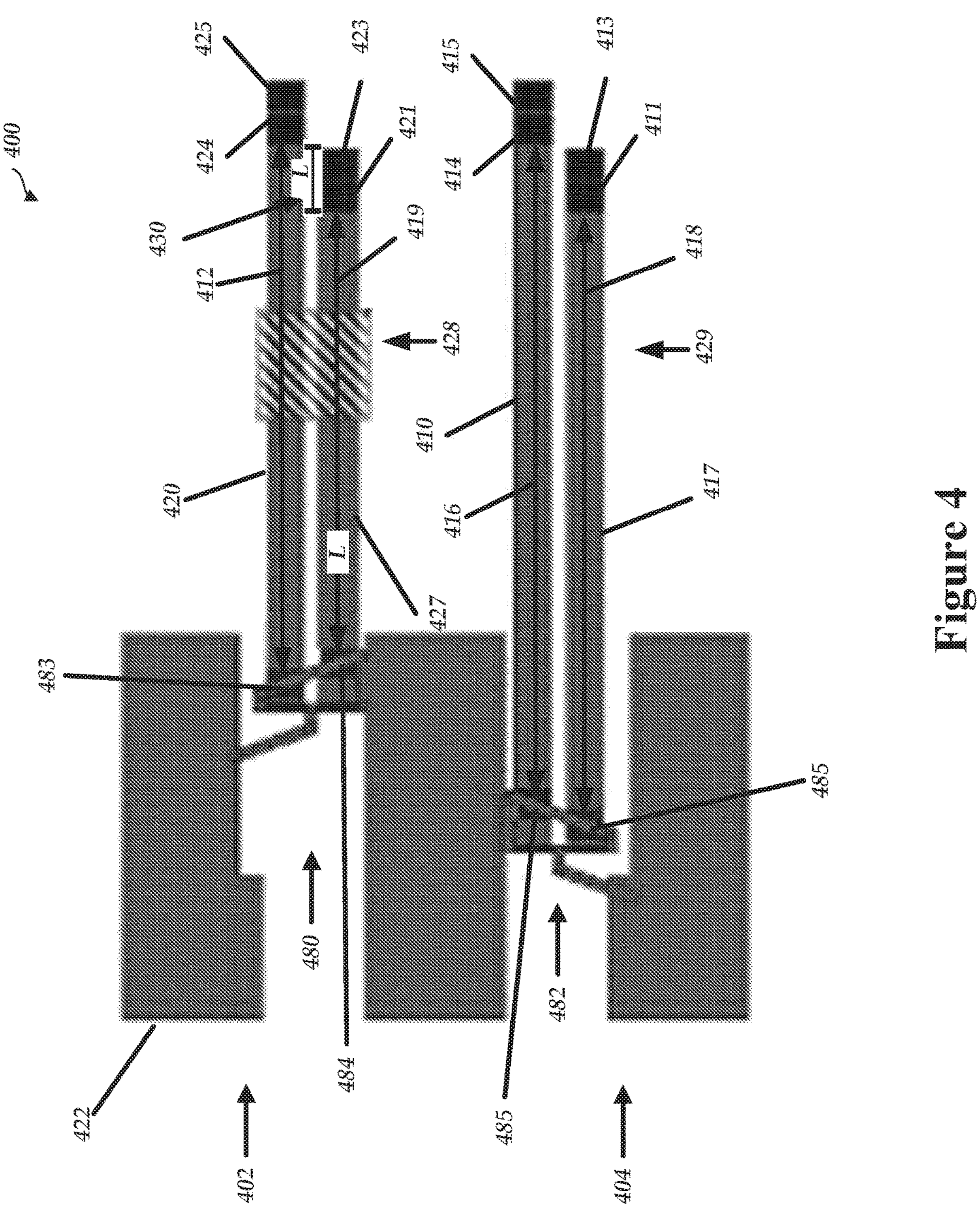
FIG. 4 illustrates a diagram of a SAW device, according to exemplary embodiments.

FIG. 4 illustrates a diagram of a SAW device 400, according to some embodiments. The SAW device 400 includes a plurality of SAW sensors 402, 404 with reflective delay lines 420, 427, 410, 417. The SAW device 400 includes two delay lines serving as sensing channel 480, where the delay line surface was immobilized with a biomaterial (such as antibody) for capturing specific analytes. The SAW device 400 also includes two delay lines serving as reference channels 482 for measuring any environmental effects such as temperature, stress, etc. In some instances herein, the SAW device 400 will be described with respect to sensor 402. Each of the other SAW sensors 404 can have components or features similar or different to those described with respect to SAW sensor 402.

The SAW sensor 402 or sensing channel 480 includes two IDTs 483, 484, two delay lines 420, 427, and four reflectors 424, 425, 421, 423, and a sensing area 428. As illustrated, in some embodiments (non-limiting example: when the excitation signal is a wideband), a delay line can have multiple reflectors. For example, delay line 420 includes a first reflector 424 and a second reflector 425. The first reflector 424 can be configured to reflect surface acoustic waves at a first frequency and the second reflector can be configured to reflect surface acoustic waves at a second frequency (e.g., different than the first frequency). In some instances, the inclusion of multiple reflectors on a single delay line advantageously enhancing the performance of the matched filter. The SAW sensor 404 or reference channel 482 includes two IDTs 485, 486, two delay lines 410, 417, four reflectors 414, 415, 411, 413, and a reference area 429. As illustrated, the delay lines of all of the reference channels and sensing channels of the SAW device 400 have a different length 412, 419, 416, 418.

In some instances, the sensing channel 480 can have the same or similar features as delay line 226 of FIG. 2A. For example, the sensing channel 480 can be utilized to detect or measure analytes which are attached to sensing area 428. A surface acoustic wave is transmitted in the sensing channel 480, along the delay lines 420, 427. An analyte, such as a biomaterial, can be placed in the sensing area 428. As the surface acoustic wave propagates along the delay line, the analyte modulates the wave (e.g., phase, frequency, amplitude modulation, etc.). The SAW sensor 402 can generate a receiving signal which corresponds to the modulated surface acoustic wave. The receiving signal can then be compared to the excitation signal to determine in what ways the receiving signal was modulated by the analyte. Characteristics of the analyte can then be determined based at least in part on the modulation of the receiving signal.

In some instances, the reference channel 482 can be utilized to measure physical or chemical interferences that are not associated with the analyte to be measured. For example, physical or chemical interferences might affect the propagation of the surface acoustic wave, thereby altering the receiving signals. By measuring or determining the physical chemical interferences (e.g., associated with environmental temperature, viscosity, stress, pressure, velocity, etc.), the receiving signals can be adjusted to remove alternations that may have been caused by the interferences.

For example, SAW sensors can be sensitive to the affections of, among other things, environmental temperature fluctuations, stress or strain applied on the piezoelectric substrate, viscosity of a biological liquid (such as whole blood, serum, and urine), etc. Accordingly, a reference channel 482 can be used in conjunction with a sensing channel 480. The surface acoustic wave of the sensing channel 480 will be modulated or modified by the analyte as well as the environmental, chemical, or physical interferences, as described above. In some instances, the reference channel 482 can be utilized such that a surface acoustic wave is not modulated by an analyte but is modulated by the same interferences as the sensing channel. The receiving signal resulting from the sensing channel can then be altered to compensate for the inferences determined with the reference channel 482.

Figure 5:
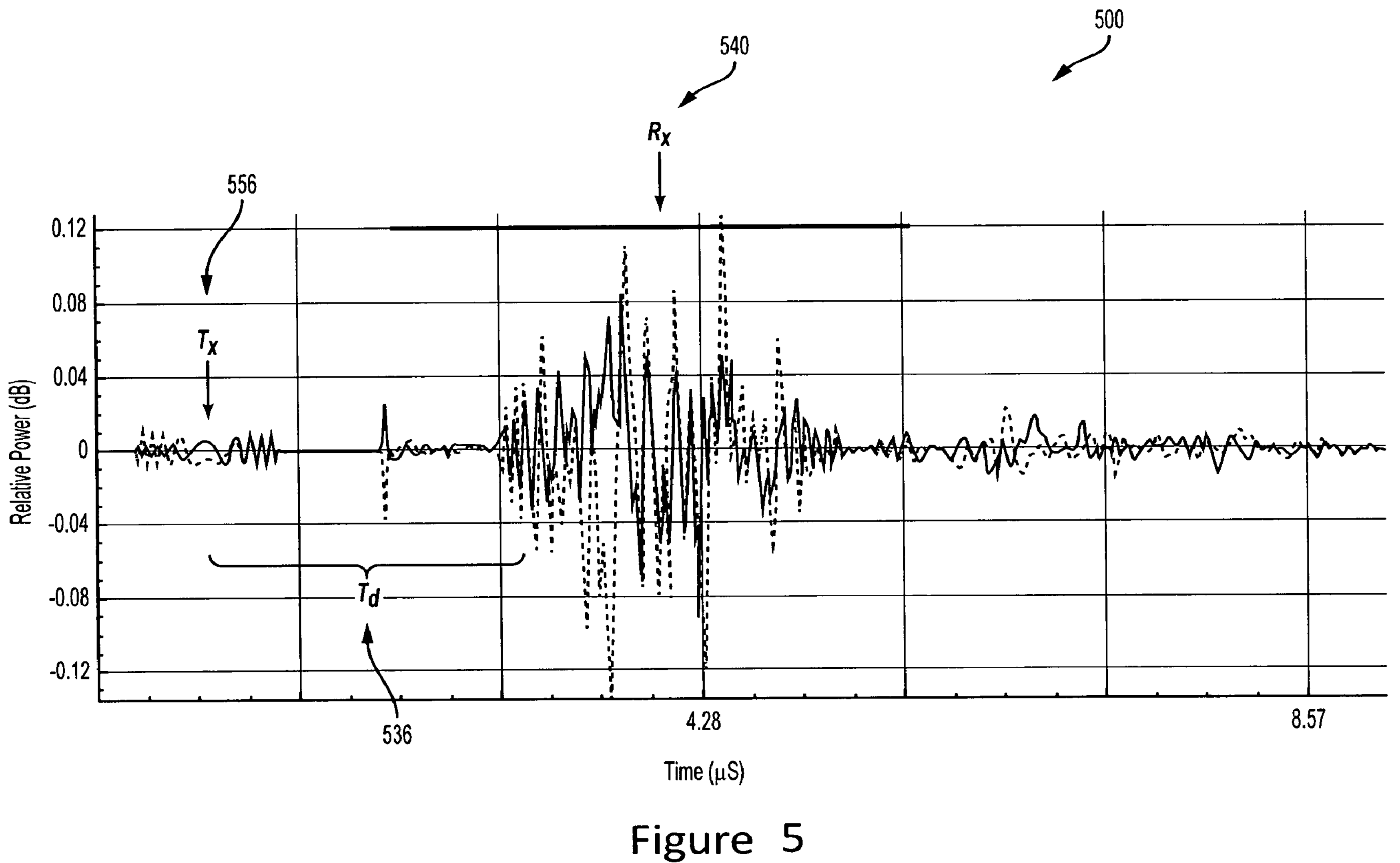
FIG. 5 illustrates graph of an excitation signal and a receiving signal corresponding to SAW device of FIG. 4, according to exemplary embodiments.

FIG. 5 illustrates a graph 500 of an excitation signal ($T_x$) 556 and a receiving signal ($R_x$) 540 corresponding to SAW device 400 of FIG. 4, according to some embodiments. As described above, the SAW device 400 includes two SAW sensors 402, 404 having reflective delay lines. Each SAW device 400 has two channels (a sensing channel 480 and a reference channel 482). The sensing channels 420, 427 correspond to where the delay line surface was immobilized with a biomaterial (such as antibody) for capturing specific analytes. The reference channels 410, 417 are for measuring any environmental effects such as temperature, stress, etc. Each channel has a corresponding delay line 420, 427, 410, 417, where each of the delay lines is different in length 412, 419, 416, 418.

In this example, the SAW device 400 was excited with a chirp signal (Tx) 556 having a center frequency of 520 MHz and a bandwidth of 56 MHz. The response signal (Rx) 540 generated by the SAW device 400 contained encoded information from the eight reflectors (e.g., 2 reflectors on each of the four delay lines). The length (L) of the shortest delay line (e.g., length 419 of FIG. 4) is approximately 5.4 mm, and the length difference (ΔL) is approximately 0.4 mm between the reflectors. Accordingly, the first peak or pulse of the response signal (Rx) 540 was received approximately 2.63 μs ($T_d$) 536 after the excitation signal (Tx) 556 was transmitted. In addition, an approximate 0.2 μs delay ($\Delta T_d$) exists between each subsequent peak.

Figure 6:
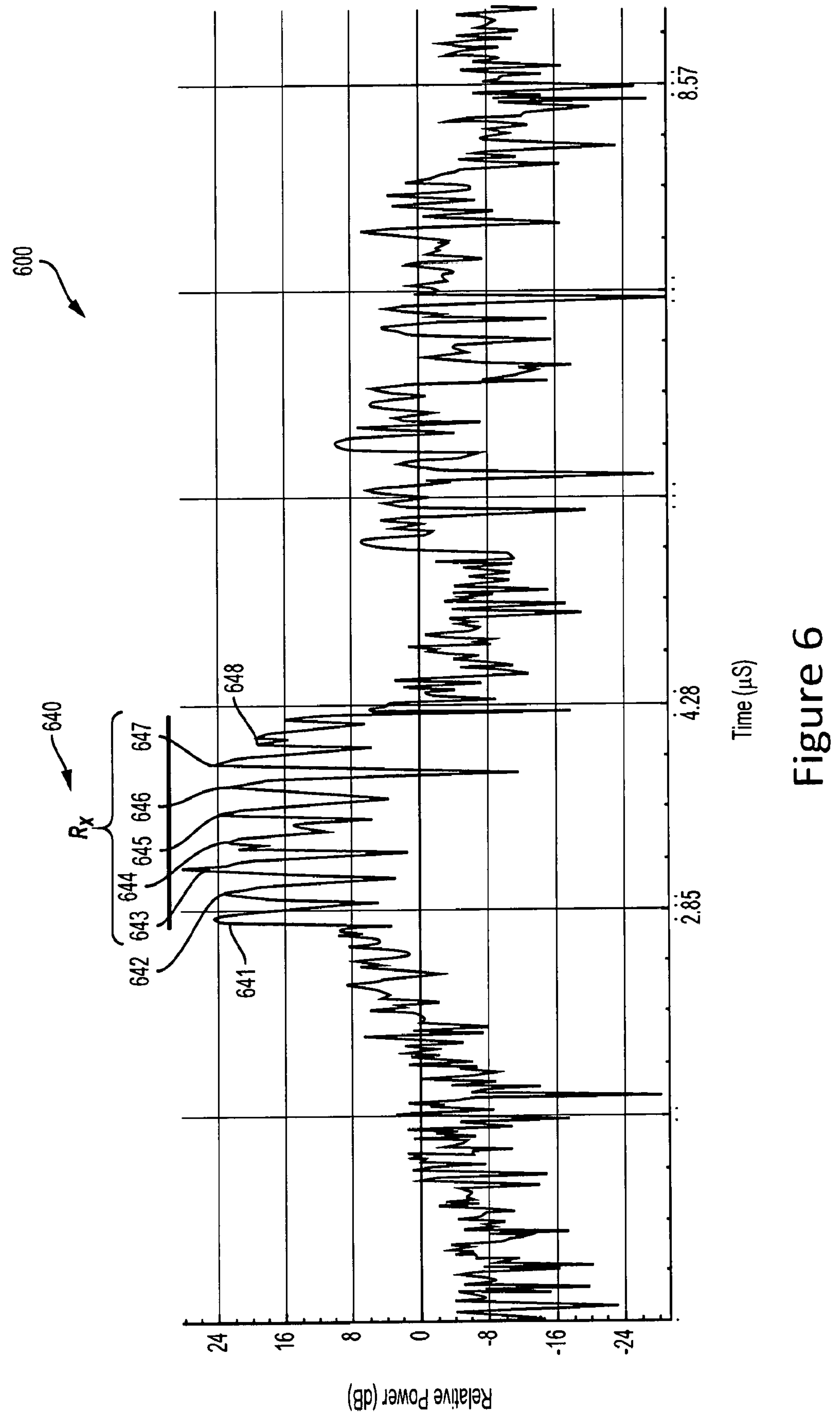
FIG. 6 illustrates a graph of a compressed pulse train corresponding to the receiving signal of FIG. 5.

FIG. 6 illustrates a graph 600 of a compressed pulse train (Rx) 640 corresponding to the receiving signal (Rx) 540 of FIG. 5. In this example, a deconvolution and match filtered process, such as those described with respect to FIGS. 3A-3B, were performed on the signal of FIG. 5 to generate the compressed pulse train (Rx) 640. As illustrated, the compressed pulse train (Rx) 640 has eight peaks or pulses 641, 642, 643, 644, 645, 646, 647, 648, each corresponding to a respective reflector 421, 423, 424, 425, 411, 413, 414, 415 of FIG. 4.

Non-Limiting Bi-Directional Example

Figure 7:
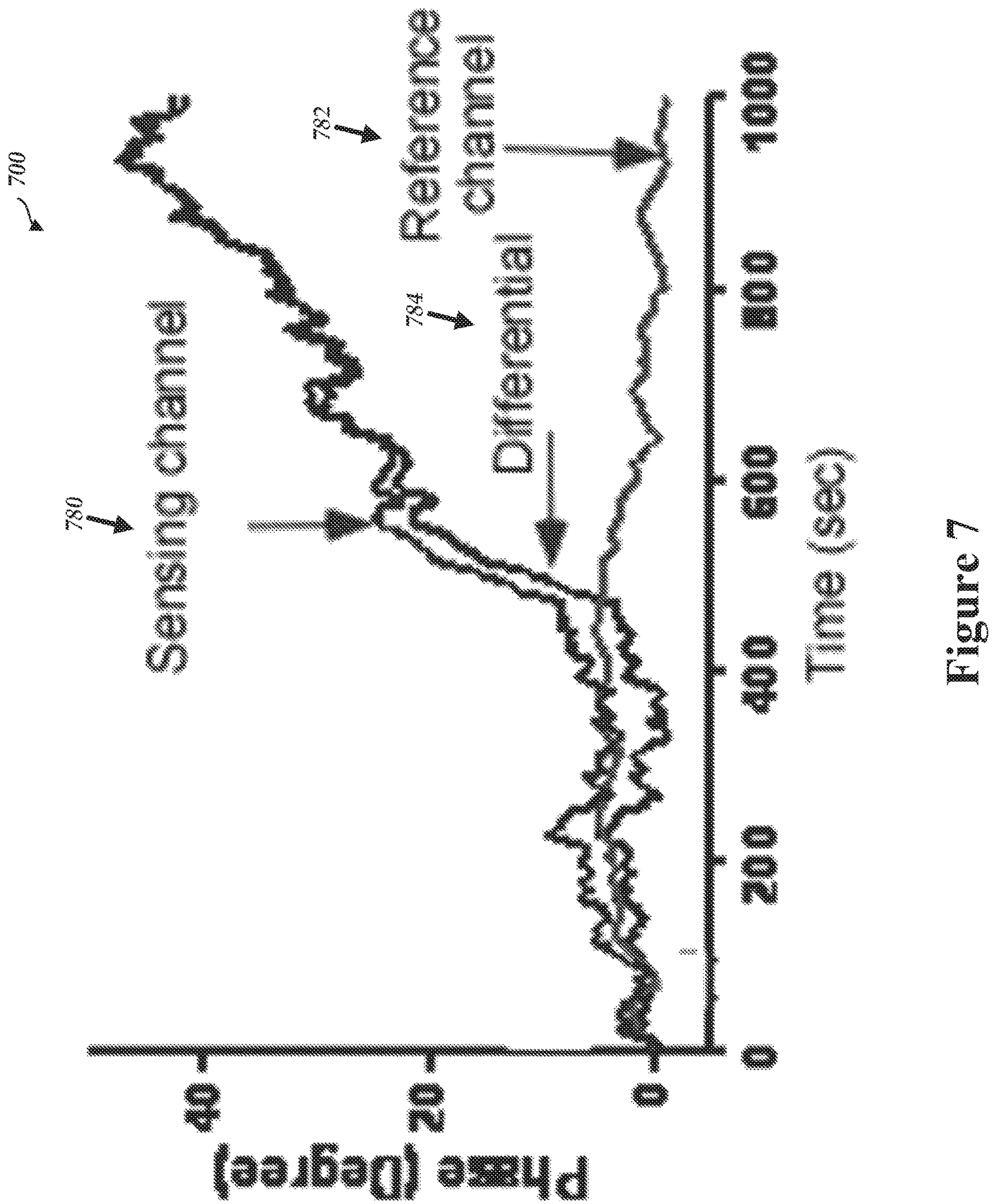
FIG. 7 illustrates real-time phase shifts of sensing and reference channels, according to exemplary embodiments.

FIG. 7 illustrates a graph 100 of real-time phase shifts of sensing channel 780 and reference channel 782, according to exemplary embodiments. As a non-limiting example, and with reference to FIG. 4, a SAW array was fabricated using standard photolithographic techniques on a 36° y-cut, x-propagating lithium tantalate (LiTaO3) wafer of 500 μm thick and 100 mm in diameter. The SAW device 400 was excited with an excitation signal having a frequency of 525 MHz. The wafer was first cleaned in a barrel asher and dipped in 1 volume percent hydrofluoric acid (HF). A photoresist was then applied onto the wafer, and patterned with photolithographic process, followed by a titanium (10 nm)/Aluminum (70 nm) metallization and liftoff process to create the IDT, aluminum waveguide and reflectors. The wafer was then diced into individual dies.

FIG. 7 shows the real-time response when the device was introduced with phosphate-buffered saline (PBS) buffer, 10 pg human chorionic gonadotropin (HCG), and 100 pg HCG at time of 0 sec, 1 min and 5 min. The sensors 402, 404 (see e.g., FIG. 4) were measured using an RF reader as a waveform generator and an RF switch, such as those described with respect to FIGS. 3A and 3B. The SAW device 400 was connected to the RF reader through the RF switch which synchronizes the transmission and receiving signals between the RF reader and the SAW sensors 402, 404. The RF reader provided a linear frequency modulation chirp signal with a center frequency of 520 MHz, and 56 MHz bandwidth.

A data acquisition system measured all-four channels simultaneously. Data was recorded in real time using a 12-bit A/D converter at a rate of 56 MHz, using a desktop computer, and the deconvolution and matched filter were conducted using a software program to extract the phase shift.

The SAW device 400 was treated with oxygen plasma to activate the surface and the whole device was coated with silane PEG-600 biotin (Nanocs). The central area (e.g., approximately 1.5 mm×1 mm) of the delay line of the sensing channels were immobilized with neutravidin followed by biotinylate anti-HCG (human chorionic gonadotropin) antibody. The excess anti-HCG was washed with HPLC water. Then, a liquid cell made of polydimethylsiloxane (PDMS) (approximately 1.5 mm wide, 4 mm long, and 0.25 mm thick) was put on top for liquid introduction. The phase shifts of both sensing 780 and reference 782 channels and the differential 784 were recorded.

Block Diagram

Figure 8:
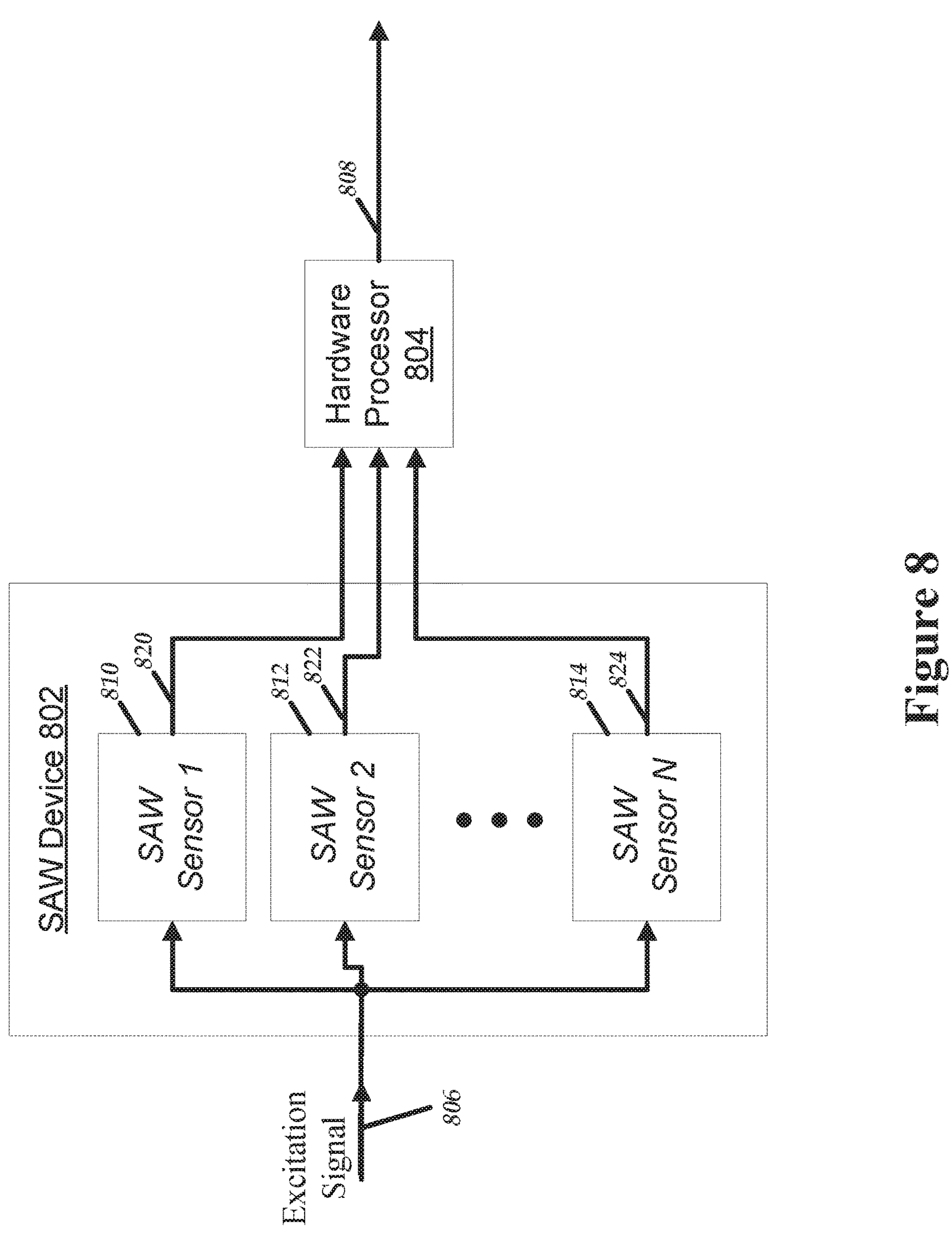
FIG. 8 is a block diagram of a multiplexing SAW device, according to exemplary embodiments.

FIG. 8 is a block diagram 800 of a multiplexing SAW device, according to exemplary embodiments. As illustrated, the SAW device 802 can include a plurality of SAW sensors 810, 812, 814. The SAW device 802 can receive an excitation signal 806. For example, the excitation signal can be directly or indirectly transmitted from a waveform generator, as described herein. As illustrated in FIG. 8, in some embodiments, the excitation signal is transmitted to one or more contacts of the SAW device 802. In some embodiments, the excitation signal is transmitted to an RF switch (not shown). The RF switch can synchronize the transmission of the excitation signal across one or more SAW sensors 810, 812, 814 of the SAW device 802. In some embodiments, the SAW device 802 has an onboard RF switch (not shown).

As described herein, the plurality of SAW sensors 810, 812, 814 receive the excitation signal 806 and generate an electrical signal 820, 822, 824. A hardware processor 804 receives the electrical signals 820, 822, 824 and generates a receiving signal 808, as described herein. For example, the receiving signal 808 can include a compressed pulse train, wherein each of the pulses corresponds to at least one of the SAW sensors 810, 812, 814. In some embodiments, the SAW device 802 saw device includes an onboard hardware processor.

Flow Diagrams

Figure 9:
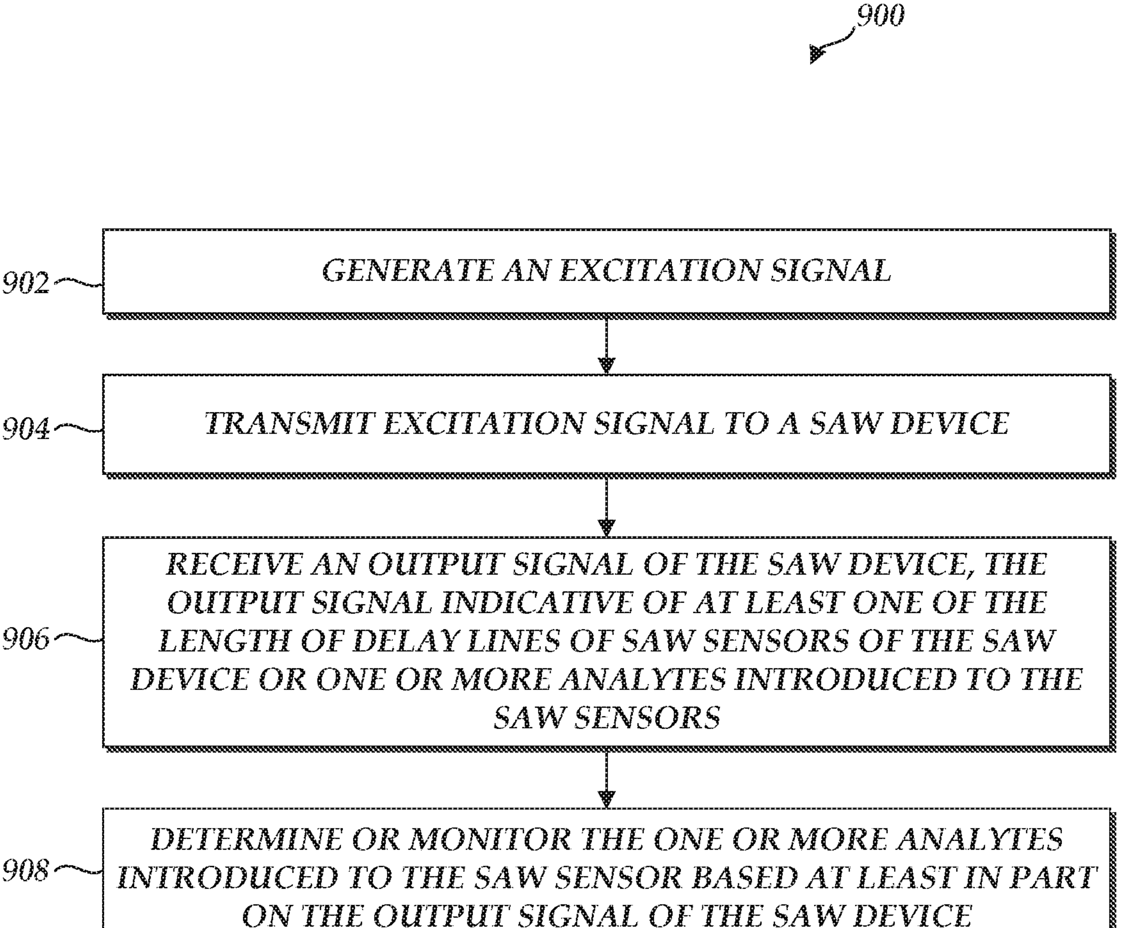
FIG. 9 is a flow diagram illustrative of an embodiment of a process implemented by a multiplexing SAW device, according to exemplary embodiments.

FIG. 9 is a flow diagram illustrative of an embodiment of a process 900 implemented by a multiplexing SAW device for determining or monitoring one or more analytes using a plurality of SAW sensors having delay lines of different lengths. One skilled in the relevant art will appreciate that the elements outlined for process 900 may be implemented by one or more computing devices or components of the multiplexing SAW device (such as a processor), another computing device, in software, etc. Accordingly, process 900 has been logically associated as being generally performed by a processor, and thus the following illustrative embodiments should not be construed as limiting.

At block 902, the process 900 generates an excitation signal. In some embodiments, the excitation signal is generated by hardware, such as by a waveform generator as described herein. In some embodiments, the excitation signal is generated by software. As described herein, in some embodiments, the excitation signal includes at least one of a variety of signals including, but not limited to, a pulse voltage, a sinusoidal electrical signal, frequency modulation, linear frequency modulation, hyperbolic frequency modulation, orthogonal frequency coding, random modulation, continuous phase modulation, frequency shift key, multi-frequency shift key, phase shift key, or wavelet modulation.

At block 904, the process 900 transmits the excitation signal to a SAW device. The excitation signal can be directly or indirectly transmitted (e.g., through another element) to the SAW device. For example, in some embodiments, the excitation signal is transmitted to one or more contacts of the SAW device such as a positive and negative contact of the SAW device. In some embodiments, the excitation signal is transmitted to an RF switch. The RF switch can synchronize the transmission of the excitation signal across one or more SAW sensors of the SAW device.

At block 906, the process 900 receives an output signal from the SAW device. In some embodiments, the signal is indicative of one or more differences in length of delay lines of the SAW sensors of the SAW device. For example, as described herein, the SAW device can include a plurality of SAW sensors. Each SAW sensor includes a delay line of a different length. As the excitation signal propagates across the delay lines, the signals received after propagation across the delay line are each time delayed relative to each other. For example, the time delay corresponds to the difference in delay line lengths. In some embodiments, the signal received from the SAW device includes a plurality of portions, wherein each portion corresponds to a time-delayed signal associated with each SAW sensor of the SAW device. For example, the signal can include a compressed pulse signal, where each of the pulses correspond to a different SAW sensor and a difference in time between the pulses corresponds to the different in delay line length of the SAW sensors.

In some embodiments, the signal received from the SAW device is indicative of one or more analytes in a sample that was added to the SAW device. For example, each SAW sensor of the SAW device can include a receptor (also referred to as a sensitive layer) configured to bind to one or more analyte(s) on a surface of the SAW sensor. When a sample media containing the one or more analytes is placed on the SAW sensor, a physical, chemical or electrical reaction occurs between the analyte and the receptor. This physical, chemical or electrical reaction can alter (e.g., in phase, frequency, or amplitude) a surface acoustic wave as the surface acoustic wave propagates along a delay line corresponding to the physical, chemical or electrical reaction. Thus, the signal received from the SAW device can be indicative of the one or more analytes by being responsive to the physical, chemical or electrical reaction between the analyte and the receptor.

At block 908, the process 900 can determine or monitor the one or more analytes introduced to the SAW sensor based at least in part on the output signal of the SAW device. As described herein, the output signal can include portions of the signal having one or more differences in phase, frequency, amplitude, etc. The differences in phase, frequency, amplitude, etc. between the portions of the output signal and/or the excitation signal can analyze to determine or monitor the one or more analytes.

It will be understood that the various blocks described herein can be implemented in a variety of orders, and that the process 900 can implement one or more of the blocks concurrently and/or change the order, as desired. Furthermore, it will be understood that fewer, more, or different blocks can be used as part of the process 900. For example, the process 900 can include blocks similar to those of process 1000, 1100, 1200 (see e.g, FIG. 10).

Figure 10:
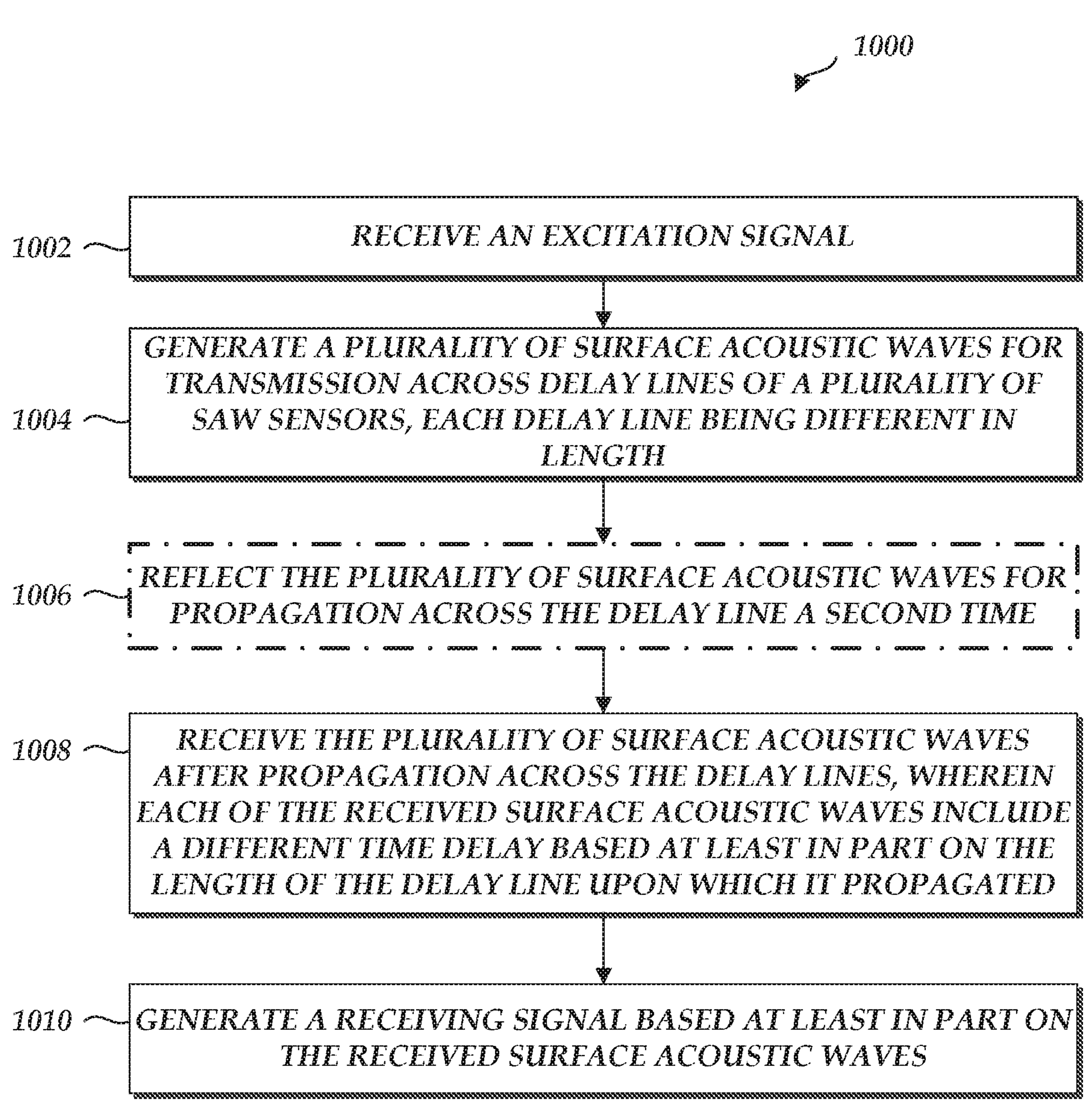
FIG. 10 is a flow diagram illustrative of an embodiment of a process implemented by a multiplexing SAW device, according to exemplary embodiments.

FIG. 10 is a flow diagram illustrative of an embodiment of a process 1000 implemented by a multiplexing SAW device for generating a receiving signal using at least a SAW device have a plurality of SAW sensors having different delay lines of different lengths. One skilled in the relevant art will appreciate that the elements outlined for process 1000 may be implemented in hardware, such as by a SAW device having a plurality of SAW sensors or a hardware processors, by one or more computing devices or components of the multiplexing SAW device (such as a hardware or other processor), another computing device, in software, etc. Accordingly, process 1000 has been logically associated as being generally performed by a processor, and thus the following illustrative embodiments should not be construed as limiting.

At block 1002, the process 1000 receives an excitation signal. In some embodiments, process 1000 receives the excitation signal directly or indirectly from hardware, such as from a waveform generator as described herein. The excitation signal includes at least one of a variety of signals including, but not limited to, a pulse voltage (e.g., $T_x$ 156, $T_x$ 256), a chirp signal (e.g., $T_x$ 556), a sinusoidal electrical signal, frequency modulation, linear frequency modulation, hyperbolic frequency modulation, orthogonal frequency coding, random modulation, a signal covering a spectrum of frequency, continuous phase modulation, frequency shift key, multi-frequency shift key, phase shift key, or wavelet modulation. In some embodiments, the process 1000 receives the excitation signal at a SAW device, such as at one or more IDTs of one or more SAW sensors.

In some embodiments, the excitation signal is received at one or more contacts of the SAW device such as a positive and negative contact of the SAW device. In some embodiments, the excitation signal is received at to an RF switch. The RF switch can be included or not included in the SAW device. The RF switch can synchronize the transmission of the excitation signal across one or more SAW sensors of the SAW device.

At block 1004, the process 1000 generates a plurality of surface acoustic waves. For example, each of one or more IDTs can convert or transduce the excitation signal into a surface acoustic wave. The process 1000 (e.g., the one or more IDTs) transmits the surface acoustic waves across delay lines of a plurality of SAW sensors. In some embodiments, each of the SAW sensors includes a delay line of a different length. In some embodiments, one or more of the delay lines are the same or substantially the same length.

At block 1006, the SAW device includes one or more reflectors configured to reflect the surface acoustic waves. For example, each of the plurality of SAW sensors can include a bidirectional sensor array such that each includes a reflector. A reflector can reside on the substrate, opposite the IDT. The surface acoustic wave is transmitted from the IDT and propagates though the substrate, before reaching the reflector. The reflector generates an echo of the surface acoustic wave (or reflects the wave), which causes the surface acoustic wave to propagate from the reflector to an IDT (e.g., the transmitting IDT, a receiving IDT, etc.). Thus, in some embodiments, the surface acoustic wave propagates through a substrate, or across a delay line multiple times. It should be noted that, in some embodiments, the SAW device does not include reflectors. Instead, the SAW sensors can include a unidirectional sensor array such that the surface acoustic wave propagates through a substrate once, and is then received, for instance, with an IDT.

At block 1008, the process 1000 receives the plurality of surface acoustic waves. In some embodiments, such as with a SAW sensor including a bidirectional sensor array, the surface acoustic waves are received by an IDT after propagating across the delay line twice. In some embodiments, such as with a SAW sensor including a unidirectional sensor array, the surface acoustic waves are received by an IDT after propagating across the delay line once. As described herein, due to the different lengths of the delay lines, the propagation time of each surface acoustic wave is different.

At block 1010, the process 1000 generates a receiving signal based at least in part on the received surface acoustic waves. For instance, the process 1000 can convert each of the propagated waves into an electrical signal. For example, the propagated waves can be received by a plurality of IDTs. The plurality of IDTs can convert or transduce the propagated surface acoustic waves into electrical or other signals. In some embodiments, each of the electrical or other signals is combined into a single signal (termed receiving signal). In some embodiments, the process 1000 generates a compressed pulse train, wherein one or more of the pulses correspond to the different SAW sensors of the SAW device. For example, each pulse can correspond to a different SAW sensor. In addition or alternatively, the pulses can each include a different time delay based on the length of a corresponding delay line. In some embodiments, an electrical signal corresponding to each SAW sensor is combined in a compressed pulse train. In some embodiments, signal processing software separates the signals or pulses of the compressed pulse train.

It will be understood that the various blocks described herein can be implemented in a variety of orders, and that the process 1000 can implement one or more of the blocks concurrently and/or change the order, as desired. Furthermore, it will be understood that fewer, more, or different blocks can be used as part of the process 1000. For example, process 1000 may not include block 1006 because, for example, the SAW device includes a unidirectional sensor array. In addition or alternatively, the process 1000 can include blocks similar to those of processes 900, 1100, 1200.

Figure 11:
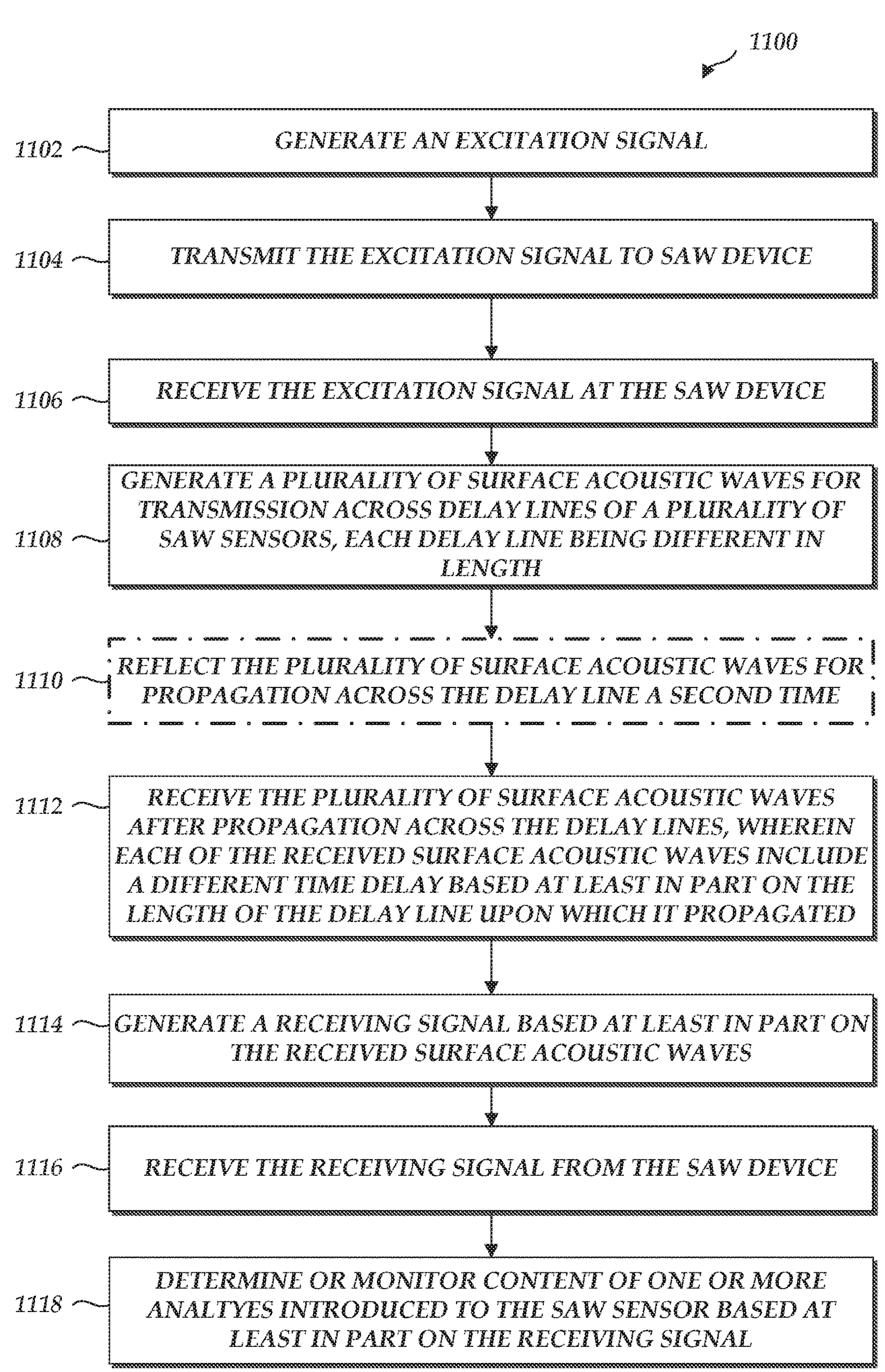
FIG. 11 is a flow diagram illustrative of an embodiment of a process implemented by a multiplexing SAW device, according to exemplary embodiments.

FIG. 11 is a flow diagram illustrative of an embodiment of a process 1100 implemented by a multiplexing SAW device for determining or monitoring one or more analytes using a plurality of SAW sensors having delay lines of different lengths. One skilled in the relevant art will appreciate that the elements outlined for process 1100 may be implemented by one or more computing devices or components of the multiplexing SAW device (such as a hardware processor or other processor), another computing device, in hardware, software, etc. Accordingly, process 1100 has been logically associated as being generally performed by a processor, and thus the following illustrative embodiments should not be construed as limiting.

At block 1102, similar to block 902 of process 900, process 1100 generates an excitation signal. In some embodiments, the excitation signal is generated by hardware, such as by a waveform generator as described herein. In some embodiments, the excitation signal is generated by software. As described herein, in some embodiments, the excitation signal includes at least one of a variety of signals including, but not limited to, a pulse voltage, a sinusoidal electrical signal, frequency modulation, linear frequency modulation, hyperbolic frequency modulation, orthogonal frequency coding, random modulation, continuous phase modulation, frequency shift key, multi-frequency shift key, phase shift key, or wavelet modulation.

At block 1104, similar to block 904 of process 900, process 1100 transmits the excitation signal to a SAW device. The excitation signal can be directly or indirectly transmitted (e.g., through another element) to the SAW device. For example, in some embodiments, the excitation signal is transmitted to one or more contacts of the SAW device such as a positive and negative contact of the SAW device. In some embodiments, the excitation signal is transmitted to an RF switch. The RF switch can synchronize the transmission of the excitation signal across one or more SAW sensors of the SAW device.

At block 1106, similar to block 1002 of process 1000, process 1100 receives an excitation signal. In some embodiments, process 1100 receives the excitation signal directly or indirectly from hardware, such as from a waveform generator as described herein. The excitation signal includes at least one of a variety of signals including, but not limited to, a pulse voltage, a sinusoidal electrical signal, frequency modulation, linear frequency modulation, hyperbolic frequency modulation, orthogonal frequency coding, random modulation, continuous phase modulation, frequency shift key, multi-frequency shift key, phase shift key, or wavelet modulation. In some embodiments, the process 1100 receives the excitation signal at a SAW device, such as at one or more IDTs of one or more SAW sensors.

In some embodiments, the process 1100 receives the excitation signal at a SAW device, such as at one or more IDTs of one or more SAW sensors. In some embodiments, the excitation signal is received at one or more contacts of the SAW device such as a positive and negative contact of the SAW device. In some embodiments, the excitation signal is received at to an RF switch. The RF switch can be included or not included in the SAW device. The RF switch can synchronize the transmission of the excitation signal across one or more SAW sensors of the SAW device.

At block 1108, similar to block 1004 of process 1000, process 1100 generates a plurality of surface acoustic waves. For example, each of one or more IDTs can convert or transduce the excitation signal into a surface acoustic wave. The process 1100 (e.g., the one or more IDTs) transmits the surface acoustic waves across delay lines of a plurality of SAW sensors. In some embodiments, each of the SAW sensors includes a delay line of a different length. In some embodiments, one or more of the delay lines are the same or substantially the same length.

At block 1110, similar to block 1006 of process 1000, the SAW device includes one or more reflectors configured to reflect the surface acoustic waves. For example, each of the plurality of SAW sensors can include a bidirectional sensor array such that each includes a reflector. A reflector can reside on the substrate, opposite the IDT. The surface acoustic wave is transmitted from the IDT and propagates though the substrate, before reaching the reflector. The reflector generates an echo of the surface acoustic wave (or reflects the wave), which causes the surface acoustic wave to propagate from the reflector to an IDT (e.g., the transmitting IDT, a receiving IDT, etc.). Thus, in some embodiments, the surface acoustic wave propagates through a substrate or across a delay line multiple times. It should be noted that, in some embodiments, the SAW device does not include reflectors. Instead, the SAW sensors can include a unidirectional sensor array such that the surface acoustic wave propagates through a substrate once, and is then received, for instance, with an IDT.

At block 1112, similar to block 1008 of process 1000, the process 1100 receives the plurality of surface acoustic waves. In some embodiments, such as with a SAW sensor including a bidirectional sensor array, the surface acoustic waves are received by an IDT after propagating across the delay line twice. In some embodiments, such as with a SAW sensor including a unidirectional sensor array, the surface acoustic waves are received by an IDT after propagating across the delay line once. As described herein, due to the different lengths of the delay lines, the propagation time of each surface acoustic wave is different.

At block 1114, similar to block 1010 of process 1000, process 1100 generates a receiving signal based at least in part on the received surface acoustic waves. For instance, the process 1100 can convert each of the propagated waves into an electrical signal. For example, the propagated waves can be received by a plurality of IDTs. The plurality of IDTs can convert or transduce the propagated surface acoustic waves into electrical or other signals. In some embodiments, each of the electrical or other signals is combined into a single signal (termed receiving signal). In some embodiments, the process 1100 generates a compressed pulse train, wherein one or more of the pulses correspond to the different SAW sensors of the SAW device. For example, each pulse can correspond to a different SAW sensor. In addition or alternatively, the pulses can each include a different time delay based on the length of a corresponding delay line.

At block 1116, similar to block 906 of process 900, process 1100 receives a signal from the SAW device. In some embodiments, the signal is indicative of one or more differences in length of delay lines of the SAW sensors of the SAW device. For example, as described herein, the SAW device can include a plurality of SAW sensors. Each SAW sensor includes a delay line of a different length. As the excitation signal propagates across the delay lines, the signals received after propagation across the delay line are each time delayed relative to each other. For example, the time delay corresponds to the difference in delay line lengths. In some embodiments, the signal received from the SAW device includes a plurality of portions, wherein each portion corresponds to a time-delayed signal associated with each SAW sensor of the SAW device. For example, the signal can include a compressed pulse signal, where each of the pulses correspond to a different SAW sensor and a difference in time between the pulses corresponds to the different in delay line length of the SAW sensors.

In some embodiments, the signal received from the SAW device is indicative of one or more analytes in a sample that was added to the SAW device. For example, each SAW sensor of the SAW device can include a receptor (also referred to as a sensitive layer) configured to bind to one or more analyte(s) on a surface of the SAW sensor. When a sample media containing the one or more analytes is placed on the SAW sensor, a physical, chemical or electrical reaction occurs between the analyte and the receptor. This physical, chemical or electrical reaction can alter (e.g., in phase, frequency, or amplitude) a surface acoustic wave as the surface acoustic wave propagates along a delay line corresponding to the physical, chemical or electrical reaction. Thus, the signal received from the SAW device can be indicative of the one or more analytes by being responsive to the physical, chemical or electrical reaction between the analyte and the receptor.

At block 1118, similar to block 908 of process 900, process 1100 determines or monitors the one or more analytes introduced to the SAW sensor based at least in part on the output signal of the SAW device. As described herein, the output signal can include portions of the signal having one or more differences in phase, frequency, amplitude, etc. The differences in phase, frequency, amplitude, etc. between the portions of the output signal and/or the excitation signal can analyze to determine or monitor the one or more analytes.

It will be understood that the various blocks described herein can be implemented in a variety of orders, and that the process 1100 can implement one or more of the blocks concurrently and/or change the order, as desired. Furthermore, it will be understood that fewer, more, or different blocks can be used as part of the process 1100. For example, the process 1100 can include blocks similar or different to those of process 1000, 1100, 1200.

Figure 12:
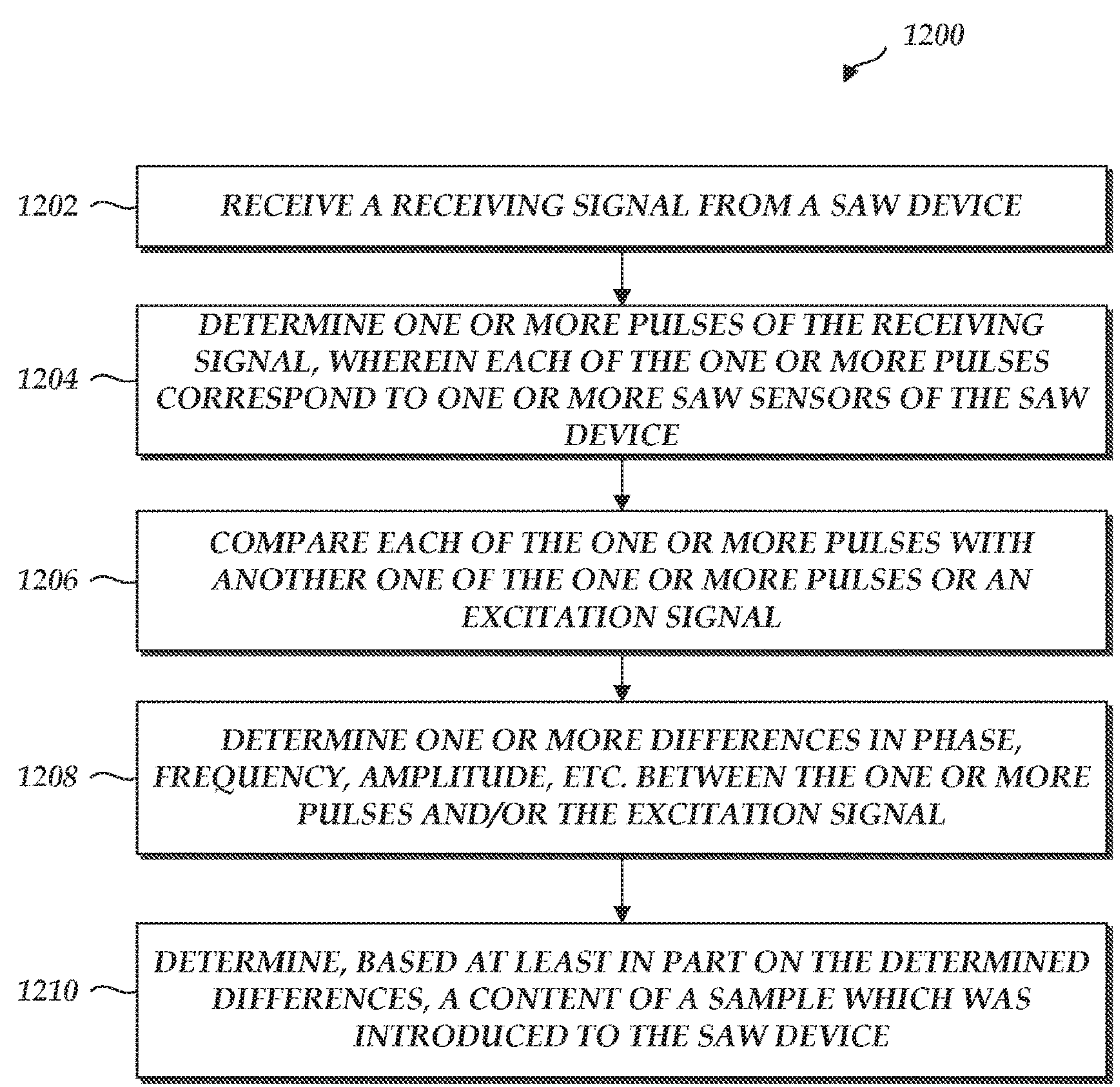
FIG. 12 is a flow diagram illustrative of an embodiment of a process implemented by a multiplexing SAW device, according to exemplary embodiments.

FIG. 12 is a flow diagram illustrative of an embodiment of a process 1200 implemented by a multiplexing SAW device for determining or monitoring one or more analytes using a plurality of SAW sensors having delay lines of different lengths. One skilled in the relevant art will appreciate that the elements outlined for process 1200 may be implemented by one or more computing devices or components of the multiplexing SAW device (such as a processor), another computing device, in software, etc. Accordingly, process 1200 has been logically associated as being generally performed by a processor, and thus the following illustrative embodiments should not be construed as limiting.

At block 1202, similar to block 1106 of process 1100 and block 906 of process 900, process 1200 receives a signal from the SAW device. In some embodiments, the signal is indicative of one or more differences in length of delay lines of the SAW sensors of the SAW device. For example, as described herein, the SAW device can include a plurality of SAW sensors. Each SAW sensor includes a delay line of a different length. As the excitation signal propagates across the delay lines, the signals received after propagation across the delay line are each time delayed relative to each other. For example, the time delay corresponds to the difference in delay line lengths. In some embodiments, the signal received from the SAW device includes a plurality of portions, wherein each portion corresponds to a time-delayed signal associated with each SAW sensor of the SAW device.

At block 1204, the process 1200 identifies or determines one or more pulses of the receiving signal. For example, the receiving signal can include a compressed pulse train such as described herein. Each of the peaks or pulses can corresponds to a different surface acoustic wave which propagated across a delay line of a different length. Accordingly, because the delay lines are of a different length, each of the pulses occurs in the compressed pulse train at a different time.

At block 1206, the process 1200 compares each of the identified pulses of the receiving signal to another one of the one or more pulses or the excitation signal. As a non-limiting example, a SAW device includes a plurality of SAW sensors, each having a delay line of a different length. At least some of the SAW sensors also include a receptor configured to bind to one or more analytes. A sample media (potentially including one or more analytes) is introduced to the SAW sensors such that it contacts the one or more receptors of the SAW sensors. When a sample media containing the one or more analytes is placed on the SAW sensor, a physical, chemical or electrical reaction occurs between the analyte and the receptor. An excitation single is introduced into the SAW device using a waveform generator. When the excitation signal is introduced to the SAW device, each of the SAW sensors are simultaneously excited such that each generate a surface acoustic wave from the excitation signal. The surface acoustic waves propagate along the delay lines and depending on whether the sample media contains the one or more analytes, some of the surface acoustic waves can be altered in phase, frequency, amplitude, etc. Each of the identified pulses correspond at least one of the surface acoustic waves which may have been altered. Thus, at block 1206, the process 1200 can compare the phase, frequency, amplitude, etc. of each of the pulses or the excitation signal.

At block 1208, based at least in part on the comparison at step 1206, the process 1200 determines one or more differences in phase, frequency, amplitude, etc. between the one or more pules or the excitation signal. For example, a SAW device or system can include phase detection which can determine a phase corresponding to each of the plurality of pulses with respect to each other and/or the excitation signal. For example, the difference in delay line length between the SAW sensors results in a time delay between the pulses of the received signal (Rx). The shifts in time domain between the pulses of the compressed pulse train correspond to phase shifts associated with a particular SAW sensor. The phase shifts can be determined, for example, using a software program or FPGA (field programmable gate array) hardware.

At block 1210, the process 1200 determines or monitors the content of the sample media introduced to the SAW device. For example, as described herein, if an analyte exists in a sample, it will create a physical, chemical or electrical reaction with the receptor, which will ultimately alter at least a pulse of the receiving signal. For example, changes in velocity or amplitude of the surface acoustic wave can correspond to changes in amplitude, frequency, phase-shift, or time-delay in the receiving signal, as compared to the excitation signal. By comparing the pulses to other pulses or to the excitation signal, the process 1200 can determine in what way (if at all) the surface acoustic wave was altered as it propagated across the delay. Using this information, the process can identify analytes present in the sample or can monitor the analytes in the sample. For example, the process 1200 may utilize a local or remote database including information on how a surface acoustic wave may be altered by a specific physical, chemical or electrical reaction, as described herein. Once the process 1200 determines how the surface acoustic wave (or the pulse) was altered, it matches or compares the alterations to identified alterations in the database. In some instance, the process can include a learning feature which can update the database based on determined results.

The resulting system offers the advantage of simultaneous excitation and allows for sensing of multiple analytes, targets or bio-agents simultaneously. A SAW sensor can thus indicate the presence of an individual substance to which it reacts specifically. An indication regarding the amount of the substance present can be provided by the phase change of the measurement signal. As a whole, the sensor chip (e.g., the SAW device 100, SAW device 200, array of SAW Sensors 364) thus forms a detector with its multiple individual sensor elements, the detector being able to simultaneously identify a large number of various substances during a single test procedure.

It will be understood that the various blocks described herein can be implemented in a variety of orders, and that the process 1200 can implement one or more of the blocks concurrently and/or change the order, as desired. Furthermore, it will be understood that fewer, more, or different blocks can be used as part of the process 1200. For example, the process 1200 can include blocks similar or different to those of process 900, 1000, 1100.

It will be understood that although the various embodiments described herein reference surface acoustic waves, SAW sensors, and/or SAW devices, any of the embodiments described herein are compatible with bulk acoustic waves, BAW sensors, and/or BAW devices, or a combination of BAW and SAW sensors or devices. Accordingly, the embodiments described herein should not be limited to surface acoustic waves.

What is claimed is:

1. A surface acoustic wave (SAW) device, comprising:

a piezoelectric substrate; and a plurality of SAW sensors attached to the piezoelectric substrate and arranged on a surface of the piezoelectric substrate, the plurality of SAW sensors including a first SAW sensor comprising a first delay line configured to propagate a first surface acoustic wave, wherein the first SAW sensor comprises a transducer positioned on the substrate and a first reflector and a second reflector, each positioned on the substrate opposite the transducer, wherein the transducer transmits the first surface acoustic wave along the first delay line, and the transducer receives the first surface acoustic wave after the first surface acoustic wave reflects off at least one of the first and second reflectors and propagates along the first delay line twice, wherein the first delay line comprises a guiding layer on the first delay line that confines propagation of the first surface acoustic wave and a sensitive layer on the guiding layer of the first delay line of each of the plurality of SAW sensors, wherein the guiding layer comprises at least one of a polymer, $SiO_2$, or ZnO, and the sensitive layer attaches to or reacts with at least one analyte, and wherein the guiding layer extends along at least a portion of the first delay line;

a second SAW sensor comprising a second delay line configured to propagate a second surface acoustic wave, wherein the second SAW sensor comprises a second transducer positioned on the substrate, wherein a length of the first delay line is greater than a length of the second delay line, wherein each of the plurality of SAW sensors is configured to simultaneously receive an excitation signal; and one or more processors in communication with each of the plurality of SAW sensors, the one or more processors configured to generate a receiving signal based on a signal received from the plurality of SAW sensors, wherein the receiving signal comprises a compressed pulse train having a plurality of pulses, each pulse corresponding to a respective one of the plurality of SAW sensors.

2. The SAW device of claim 1, wherein the first reflector is positioned farther from the transducer than the second reflector along the first delay line.

3. The SAW device of claim 2, wherein the first reflector is configured to reflect a surface acoustic wave having a first frequency and the second reflector is configured to reflect a surface acoustic wave having a second frequency.

4. The SAW device of claim 1, wherein the first SAW sensor comprises a first pair of electrical contacts and the second SAW sensor comprises a second pair of electrical contacts, and wherein the first and second pairs of electrical contacts are electrically connected.

5. The SAW device of claim 1, wherein each of the plurality of SAW sensors is electrically connected to a common electrical connection configured to deliver the excitation signal simultaneously to each of the plurality of SAW sensors.

6. The SAW device of claim 5, wherein the excitation signal includes at least one of a pulse voltage, a sinusoidal electrical signal, frequency modulation, linear frequency modulation, hyperbolic frequency modulation, orthogonal frequency coding, random modulation, continuous phase modulation, frequency shift key, multi-frequency shift key, phase shift key, wavelet modulation, or a wideband frequency signal.

7. The SAW device of claim 1, wherein a timing of each pulse of the compressed pulse train is based at least in part on a length of the delay line of the corresponding SAW sensor.

8. The SAW device of claim 7, wherein the one or more processors are further configured to determine, monitor, or identify the at least one analyte based at least in part on the receiving signal.

9. The SAW device of claim 8, wherein the one or more processors are configured to determine, monitor, or identify the at least one analyte by detecting a variance in amplitude, phase, frequency, or time-delay between at least two of a pulse corresponding to an excitation signal, a pulse corresponding to the first SAW sensor, or a pulse corresponding to the second SAW sensor.

10. The SAW device of claim 7, wherein the one or more processors generate the compressed pulse train by correlating a received signal with a reference signal corresponding to the excitation signal.

11. The SAW device of claim 10, wherein the one or more processors are configured to determine a concentration of the at least one analyte based on a ratio of an amplitude of a first pulse of the compressed pulse train corresponding to the first SAW sensor, to an amplitude of a second pulse of the compressed pulse train corresponding to the second SAW sensor.

12. The SAW device of claim 11, wherein the first pulse and the second pulse are separated in time by an amount based at least in part on a difference between the length of the first delay line and the length of the second delay line.

13. The SAW device of claim 10, wherein the plurality of pulses of the compressed pulse train comprises a pulse corresponding to the excitation signal.

14. The sensor of claim 1, wherein the piezoelectric substrate comprises at least one of 36° Y quartz, 36° YX lithium tantalite, langasite, langatate, langanite, lead zirconate titanate, cadmium sulfide, berlinite, lithium iodate, lithium tetraborate, or bismuth germanium oxide.

15. The sensor of claim 1, wherein the piezoelectric substrate comprises a piezoelectric crystal layer, comprising a thickness greater than a Love Wave penetration depth on a non-piezoelectric substrate.

16. The sensor of claim 1, further comprising a detector for measuring a phase response of surface acoustic waves as a function of the at least one analyte added to the sensitive layer, wherein the sensitive layer comprises a biologically sensitive interface for capturing analytes from a liquid medium or a chemically sensitive interface for absorbing analytes from a liquid medium.

17. The sensor of claim 1, wherein the first surface acoustic wave corresponding to the first SAW sensor comprises a frequency greater than 100 MHz.

* * * * *